United States Patent
Fujita et al.

(10) Patent No.: US 8,979,351 B2
(45) Date of Patent: Mar. 17, 2015

(54) LIGHT GUIDE PLATE, DIE, AND DIE PROCESSING METHOD

(75) Inventors: Masaru Fujita, Osaka (JP); Masami Ito, Osaka (JP); Takanori Kikuchi, Osaka (JP); Yusuke Kusaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 231 days.

(21) Appl. No.: 13/590,234

(22) Filed: Aug. 21, 2012

(65) Prior Publication Data

US 2013/0051075 A1  Feb. 28, 2013

(30) Foreign Application Priority Data

Aug. 23, 2011 (JP) ................................ 2011-181934

(51) Int. Cl.
*F21V 7/04* (2006.01)
*F21V 8/00* (2006.01)

(52) U.S. Cl.
CPC ............ *G02B 6/0061* (2013.01); *G02B 6/0038* (2013.01); *G02B 6/0036* (2013.01)
USPC ....................................................... 362/626

(58) Field of Classification Search
USPC ........................................ 362/612, 623–626
See application file for complete search history.

(56) References Cited

U.S. PATENT DOCUMENTS

| 7,252,427 | B2 * | 8/2007 | Teng et al. ..................... 362/626 |
| 7,374,329 | B2 * | 5/2008 | Feng et al. ..................... 362/626 |
| 7,465,084 | B2 | 12/2008 | Kawashima et al. |
| 2005/0117370 | A1 | 6/2005 | Kawashima et al. |

FOREIGN PATENT DOCUMENTS

| JP | 2005-135843 | 5/2005 |
| JP | 2007-214071 | 8/2007 |

* cited by examiner

*Primary Examiner* — Jason Moon Han
(74) *Attorney, Agent, or Firm* — Wenderoth, Lind & Ponack, L.L.P.

(57) ABSTRACT

A light guide plate having a first surface and a second surface opposite the first surface receives light in a first direction parallel with the second surface and emits the light towards the first surface in a third direction perpendicular to the first surface. The light guide plate includes a light receiving portion which receives the light; a light guiding path which guides the light in the first direction; and an emitting portion which emits the light by reflecting the guided light towards the first surface in the third direction. The emitting portion includes a plurality of V-shaped grooves extending on the second surface in a second direction crossing the first direction. Each V-shaped groove extends in the first direction and is formed so as to be deepest in the center in the second direction and become shallower as a distance from the center increases.

10 Claims, 20 Drawing Sheets

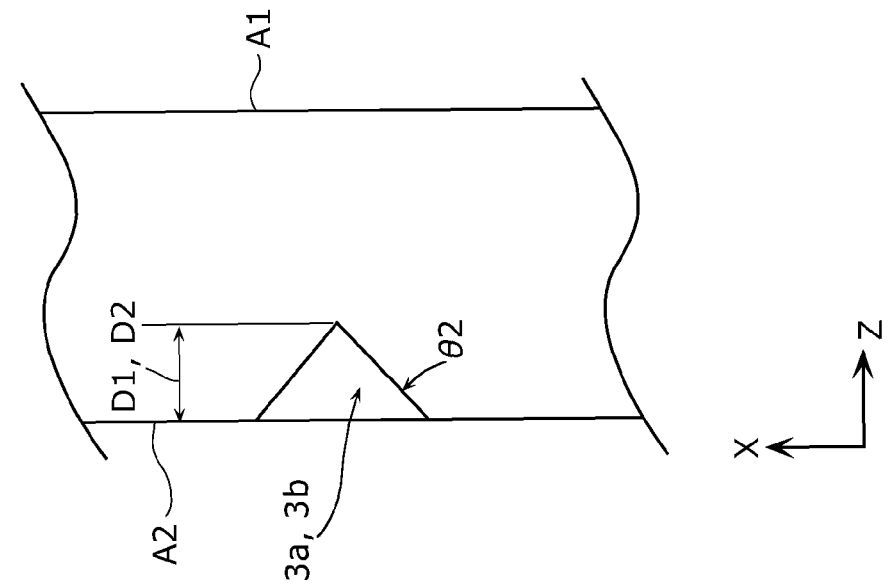
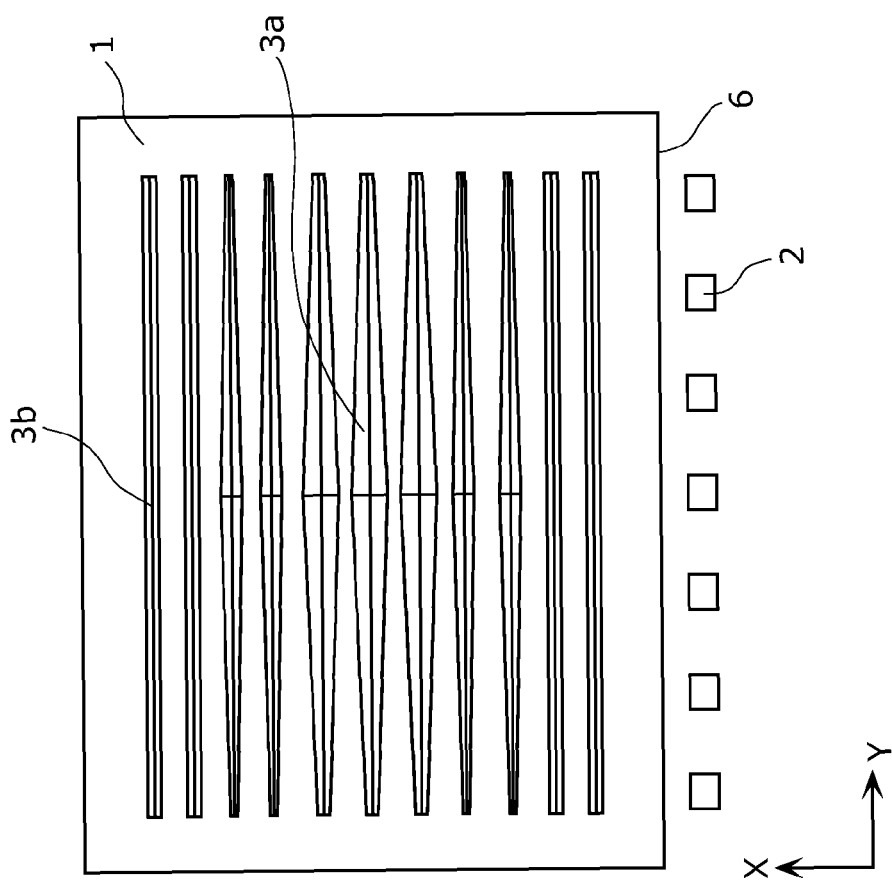

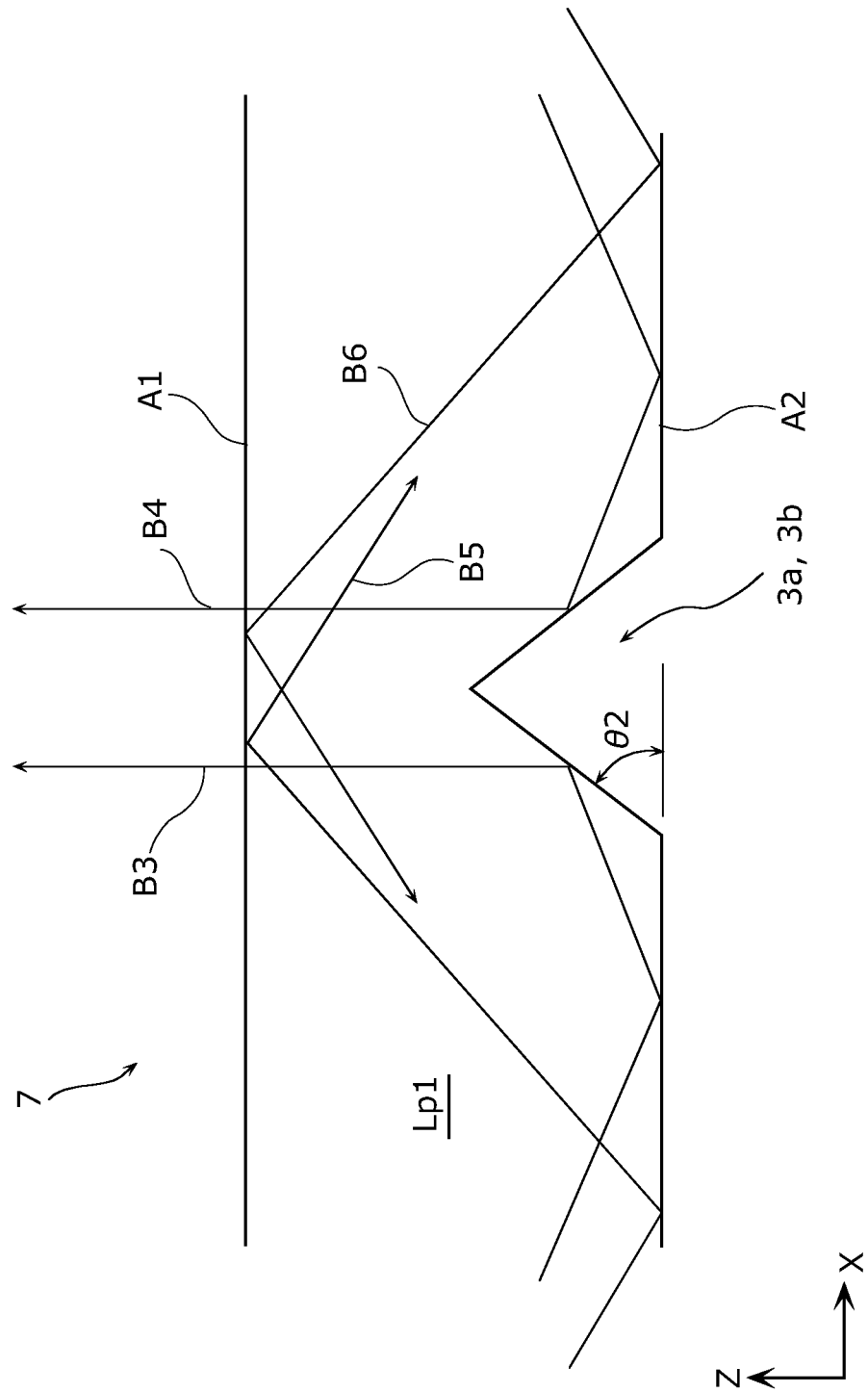

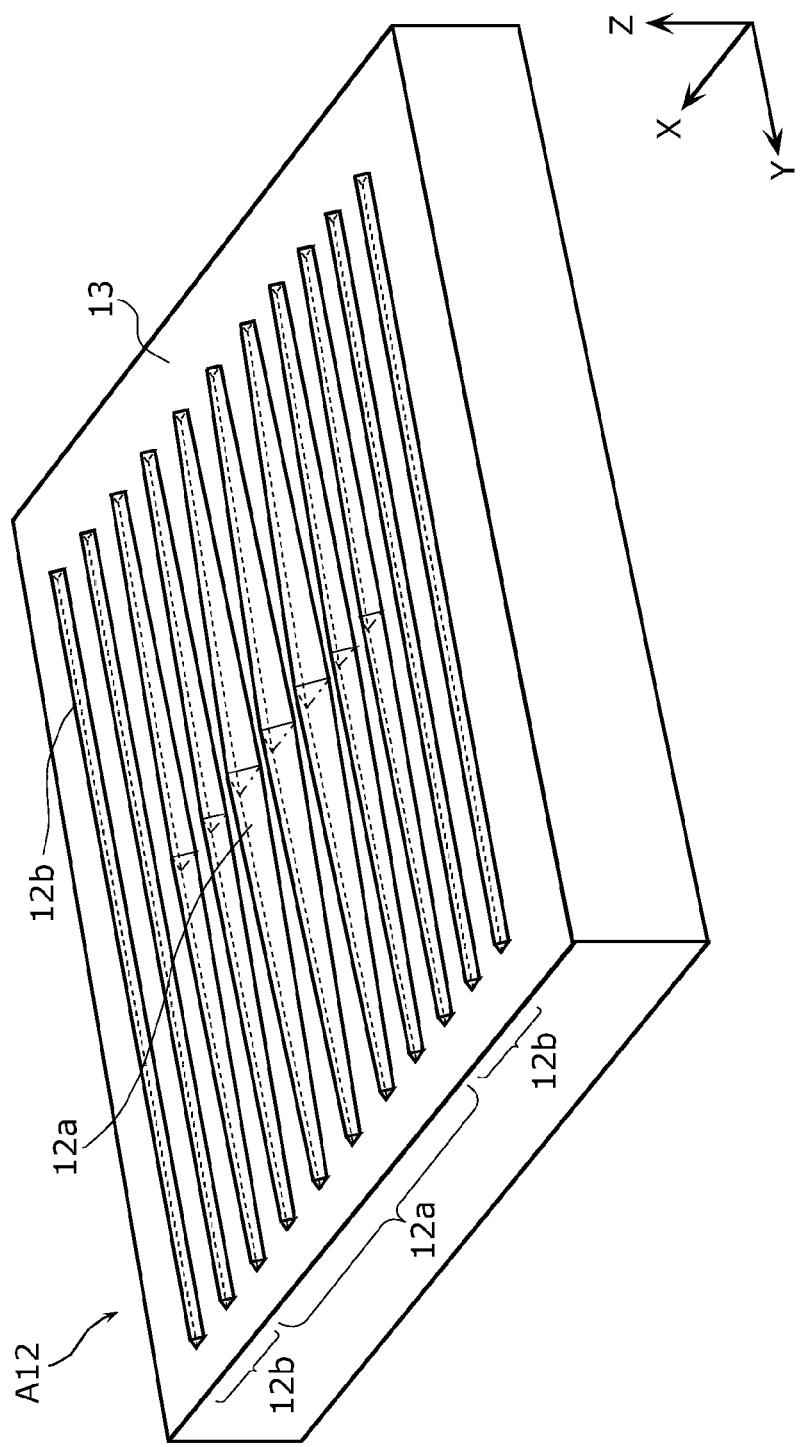

LIGHT GUIDE PLATE, DIE, AND DIE PROCESSING METHOD

CROSS REFERENCE TO RELATED APPLICATION

The present application is based on and claims priority of Japanese Patent Application No. 2011-181934 filed on Aug. 23, 2011. The entire disclosure of the above-identified application, including the specification, drawings and claims is incorporated herein by reference in its entirety.

TECHNICAL FIELD

The present invention relates to light guide plates for edge-lit backlights used in liquid crystal display (LCD) panels or lighting equipment.

BACKGROUND ART

In recent years, light-emitting diodes (LED) have been used as a light source in edge-lit backlights provided with light guide plates used in LCD panels or lighting equipment, thereby improving performance and saving energy. Disclosed in Patent Literature (PTL) 1 and PTL 2 are examples of conventional light guide plates.

CITATION LIST

Patent Literature

[PTL 1] Japanese Unexamined Patent Application Publication No. 2005-135843
[PTL 2] Japanese Unexamined Patent Application Publication No. 2007-214071

SUMMARY OF INVENTION

Technical Problem

However, avoiding luminance inconsistency and realizing high-quality imaging with low light source output is difficult with light guide plates such as those disclosed in PTL 1 and PTL 2.

In light of this, the object of the present invention is to provide a light guide plate which avoids luminance inconsistency and is capable of realizing high-quality imaging with low light source output.

Solution to Problem

In order to solve the foregoing problems, a light guide plate according to an embodiment of the present invention which has a first surface and a second surface opposite the first surface and which receives light in a first direction parallel with the second surface and emits the light towards the first surface in a third direction perpendicular to the first surface, the light guide plate comprises: a light receiving portion which receives the light; a light guiding path which guides, in the first direction, the light received by the light receiving portion; and an emitting portion which emits the light guided in the first direction by the light guiding path, by reflecting the light towards the first surface in the third direction, wherein the emitting portion is a first V-shaped groove having a V-shaped cross-section and extending on the second surface in a second direction crossing the first direction, and a plurality of first V-shaped grooves including the first V-shaped groove are provided in the first direction and formed to be deepest in a center in the second direction and become shallower as distance increases from the center along the second direction.

With this, the first V-shaped groove is provided in plurality in the first direction, and the deepest portion of the first V-shaped groove is formed in the middle of the first V-shaped groove in the second direction. In other words, the surface area of the surfaces formed by the first V-shaped groove is larger at the center in the second direction than at the end in the second direction. As a result, more of the light received from the receiving portion is reflected in the third direction at the center of the first V-shaped groove in the second direction than at both ends of the first V-shaped groove in the second direction. Thus, by optimizing the depth of the groove in this manner, it is possible to achieve high luminance in the center and a peripheral luminance distribution in which luminance decreases as distance from the center increases. This allows for high-quality imaging to be achieved with low light source output, and for an efficient, low energy backlight to be realized without a need to increase luminance across the whole surface.

It is to be noted that general or specific embodiments may also be realized as a method, an integrated circuit, a computer program, or a storage media readable by a computer, such as CD-ROM (Compact Disc), or a combination thereof.

Advantageous Effects of Invention

With the light guide plate according to the present invention, high-quality imaging can be achieved with low light source output, and an efficient, low energy backlight can be realized without a need to increase luminance across the whole surface.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings:

FIG. 2A is a plan view of the light guide plate according to the first embodiment of the present invention;
FIG. 2B is a cross-section of the prism groove according to the first embodiment of the present invention.

FIG. 7 is an enlarged view of a cross-section of the prism groove according to the second embodiment of the present invention;

FIG. 9A is a perspective view of the die insert according to the third embodiment of the present invention;

DESCRIPTION OF EMBODIMENTS

Underlying Knowledge Forming Basis of the Present Invention

The inventors have discovered the following problems that occur with respect to the light guide plates disclosed in the Background Art.

Figure 14:
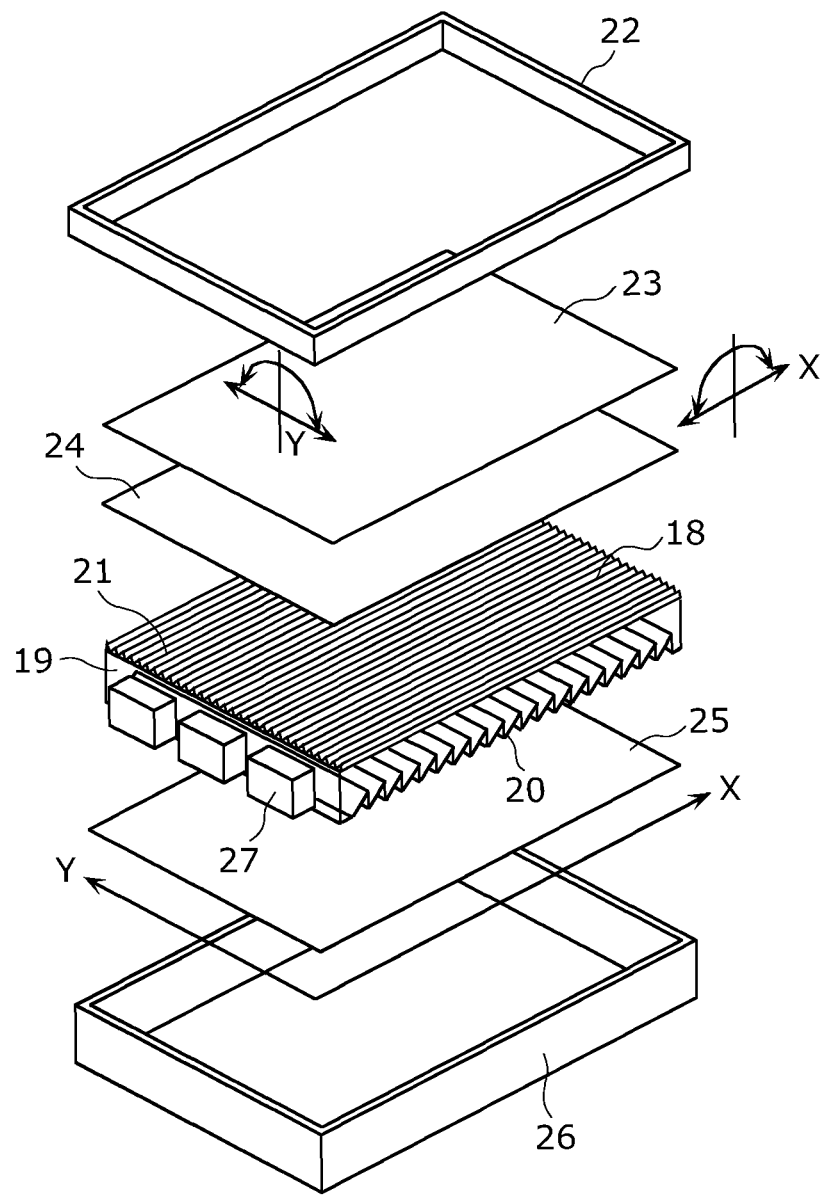
FIG. 14 is an exploded view diagram of the backlight unit disclosed in PTL 1.
Figure 15:
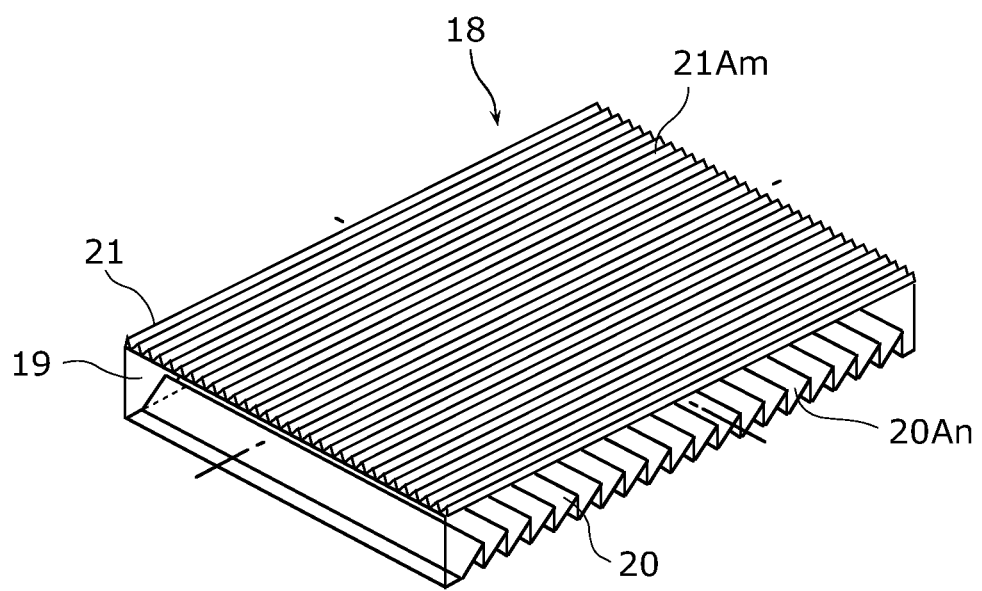
FIG. 15 is a perspective view of the light guide plate disclosed in PTL 1.

FIG. 14 shows a conventional edge-lit backlight unit (PTL 1). A light guide plate 18 is formed from a light incident surface 19 serving as a receiving surface for light, a light reflecting surface 20, and a light emitting surface 21. Arranged above the light guide plate 18 is a diffusion sheet 24, a prism sheet 23, and a frame 22 which holds the diffusion sheet 24 and the prism sheet 23 in this order from the light guide plate 18. Moreover, arranged below the light guide plate 18 is a reflecting sheet 25 which reflects light that leaks from the light reflecting surface 20 included in the light guide plate 18, a case 26 which holds the light guide plate 18 and a LED 27, and the LED 27 serving as a light source for the backlight in this order from the light guide plate 18. As shown in FIG. 15, the light guide plate 18 guides light incident from the light incident surface 19 by totally reflecting the light off the light reflecting surface 20 which is one main surface of the light guide plate 18, and off the light emitting surface 21 which is the other main surface of the light guide plate 18 positioned opposing and parallel to the light reflecting surface 20. The light is then emitted uniformly from the light emitting surface 21, whereby surface light emission is achieved. The light reflecting surface 20 is formed from an n number of the prisms 20An formed in a prism pattern, and effectively guides light in a direction towards the light emitting surface 21. The light guided by the light reflecting surface 20 is light incident from the light incident surface 19 which has been guided into the light guide plate 18. As a frame of reference, the x axis direction in the light guide plate 18 shall be defined as the direction that light is received and introduced, the y axis direction shall be defined as a direction perpendicular to the x axis direction and parallel to the light emitting surface 21, and the z axis direction shall be defined as the direction that light is emitted from the light emitting surface 21. Within this xyz frame of reference, the light distribution of the x axis directional component of the light guided by the light guide plate 18 is controlled by changing the pitch (distance) between each prism 20An arranged in a row in the x axis direction or by changing the height (width in the x axis direction) of each prism 20An. Moreover, circular grooves 21Am cylindrical in shape are formed to be parallel to the x axis direction in the light guide plate 18. The circular grooves 21Am reduce the bright lines that come from three LEDs in the x axis direction. In order to increase the uniformity of luminance on the surface of a edge-lit backlight in which light from a light source such as LEDs is input from the side of the light guide plate and emitted on the surface, a line-shaped prism pattern parallel to the row of light sources of the light guide plate is used (to obtain luminance uniformity).

Figure 16B:
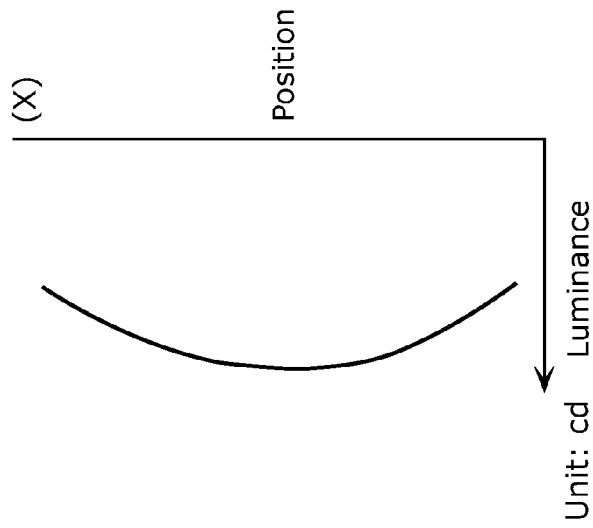
FIG. 16B shows the luminance distribution in an x axis direction of the light guide plate disclosed in PTL 1.
Figure 16A:
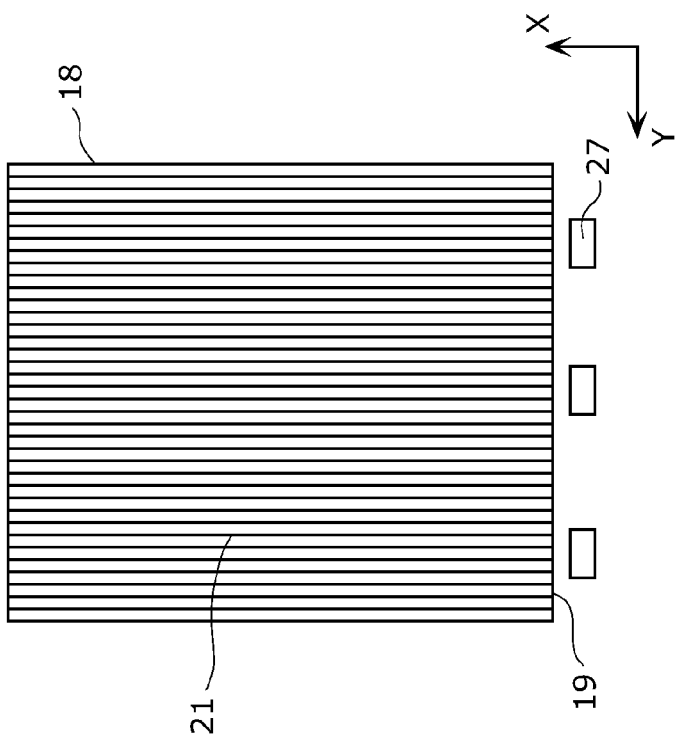
FIG. 16A is a plan view of the light guide plate disclosed in PTL 1.
Figure 16C:
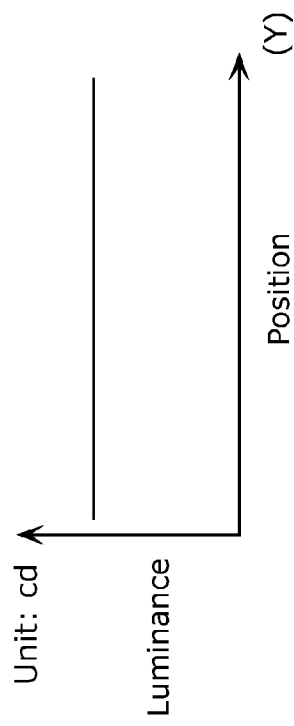
FIG. 16C shows the luminance distribution in a y axis direction of the light guide plate disclosed in PTL 1.

The luminance distribution according to the light guide plate disclosed in PTL 1 is shown in FIG. 16A, FIG. 16B, and FIG. 16C. FIG. 16A is a plain view of the light guide plate 18, FIG. 16B shows the luminance distribution of the light guide plate 18 in the x axis direction, and FIG. 16C shows the luminance distribution in the y axis direction. Light is under control in the luminance distribution in the y axis direction, as shown by the high luminance in the middle. On the other hand, as shown by the even distribution, the light is not under control in the luminance distribution in the x axis direction.

Figure 17A:
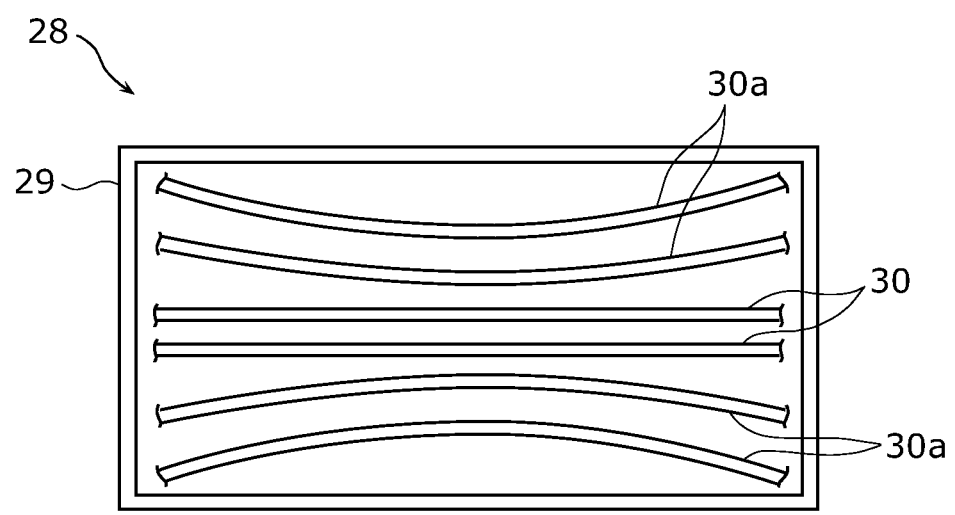
FIG. 17A is a plan schematic view of the direct-lit backlight including a cold-cathode tube disclosed in PTL 2.
Figure 17B:
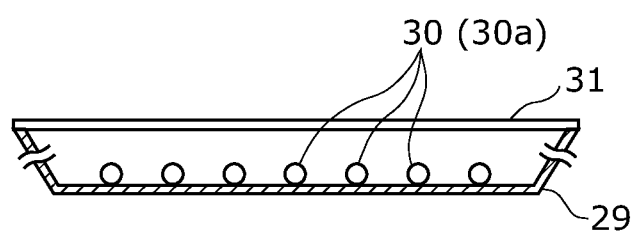
FIG. 17B is a cross-sectional view of the direct-lit backlight including a cold-cathode tube disclosed in PTL 2.

FIG. 17A shows a light guide plate such as the one stated in PTL 2 which is a light guide plate for a direct-lit backlight used in a large model LCD television display including a cold-cathode tube. FIG. 17B is a cross-sectional view of FIG. 17A. As shown in FIG. 17A and FIG. 17B, a backlight 28 is formed from straight cold-cathode tubes 30, curved cold-cathode tubes 30a, and a diffusion panel 31. The reason for the use of cold-cathode tubes 30a which are curved is explained below. With a light guide plate for a direct-lit backlight such as this, low power consumption is desirable, and high luminance and high resolution are desirable for high-quality imaging in an LCD television. Luminance is the most important of these regarding enhancing the appearance of an image. Moreover, color LCD televisions having a luminance gradient such that the center of the LCD display is more luminescent than other regions, that is, color LCD televisions backlit to have a center-oriented luminance, have better overall visibility.

It is believed it is difficult to visibly notice such a luminance distribution due to the fact that the human eye is round and the area of the screen that the eye perceives at one look is nearly round. This means that if the shape of the luminance gradient distribution on the screen is round, then the area that a human eye can perceive in one look and the shape of the luminance gradient distribution are nearly similar. In this way, the psychological impact that the luminance gradient has on the viewer can be reduced by tricking the viewer's eyes.

Consequently, in order to make perception of the luminance gradient difficult for viewer, it is preferable to nearly monotonically reduce the luminance of the image being displayed. Furthermore, making the luminance gradient symmetrical makes the luminance gradient further difficult to visually notice. As such, monotonically reducing the luminance horizontally or vertically from the center of the image proves effective. Moreover, for the same reason, the luminance gradient is made to be nearly symmetrical with respect to the horizontal axis or the vertical axis of the display image. In this way, by distributing the luminance gradient concentrically, the luminance gradient is made to be very difficult to visually notice. It is to be noted that concentric luminance distribution refers to a distribution in which a line joining the portions of the luminance that are substantially identical forms an essentially circular shape that is nearly centered on the center of the screen.

In light of these points, with the technique of curving the cold-cathode tubes 30a to make the center of the screen denser with cold-cathode tubes and increase the luminance described in PTL 2, a luminance distribution is obtained having a peak corresponding to the increased luminance in the center of the screen.

However, with the LED edge-lit light guide plate according to PTL 1, as shown in FIG. 16B, the luminance distribution is only under control in the direction in which light is introduced (x axis direction). As shown in FIG. 16C, the luminance distribution in the direction perpendicular to the direction in which light is introduced (y axis direction), which is a direction parallel to the row of light sources, is not under control. Forming a plurality of line shaped prisms 20An in a light guide plate having cylindrical luminance distribution prisms such as the one disclosed in PTL 1 is advantageous in that the prisms 20An reflect light in the emission direction (z axis direction) effectively. Moreover, by changing the pitch (distance) between each of the prisms 20An or the height of each of the prisms 20An, it is easier to control the light distribution of the x axis directional component of the light guided by the light guide plate 18. However, with the techniques disclosed in PTL 1, a problem arises in which the light distribution of the y axis directional component is difficult to control. Moreover, the effect that the circular grooves 21Am cylindrical in shape included in light emitting surface 21 have on the control of the luminance is low, and are only effective in minimizing luminance inconsistency through light diffusion. Therefore, control of light distribution in the y axis direction is difficult. For this reason, luminance in the center of the screen is visually high, and realizing a luminance distribution which takes into consideration luminance consistency is difficult with the light guide plate according to PTL 1. Moreover, because overall luminance reduces with uniformity in luminance, a problem arises in which it is necessary to increase the overall luminance beyond necessity.

Moreover, the PTL 2 including a cold-cathode tube can only be used when the cold-cathode tube 30 is used as the light source. Even if one were to arrange point light sources such as LEDs in the same positions that the cold-cathode tubes extend in, a problem arises in which the luminance becomes visually inconsistent. Moreover, when using a low transparency diffusion panel to try and correct this luminance inconsistency, yet another problem arises in which the luminance is reduced.

In order to solve the foregoing problems, a light guide plate according to an embodiment of the present invention which has a first surface and a second surface opposite the first surface and which receives light in a first direction parallel with the second surface and emits the light towards the first surface in a third direction perpendicular to the first surface, the light guide plate comprises: a light receiving portion which receives the light; a light guiding path which guides, in the first direction, the light received by the light receiving portion; and an emitting portion which emits the light guided in the first direction by the light guiding path, by reflecting the light towards the first surface in the third direction, wherein the emitting portion is a first V-shaped groove having a V-shaped cross-section and extending on the second surface in a second direction crossing the first direction, and a plurality of first V-shaped grooves including the first V-shaped groove are provided in the first direction and formed to be deepest in a center in the second direction and become shallower as distance increases from the center along the second direction.

With this, the first V-shaped groove is provided in plurality in the first direction, and the deepest portion of the first V-shaped groove is formed in the middle of the first V-shaped groove in the second direction. In other words, the surface area of the surfaces formed by the first V-shaped groove is larger at the center in the second direction than at the end in the second direction. As a result, more of the light received from the receiving portion is reflected in the third direction at the center of the first V-shaped groove in the second direction than at both ends of the first V-shaped groove in the second direction. Thus, by optimizing the depth of the groove in this manner, it is possible to achieve high luminance in the center and a peripheral luminance distribution in which luminance decreases as distance from the center increases. This allows for high-quality imaging to be achieved with few light sources, and for an efficient, low energy backlight to be realized without the need to increase luminance across the whole surface.

Moreover, it is preferable that an angle of a reflecting surface of the first V-shaped groove which reflects the light range from 45 degrees to 60 degrees relative to the first direction.

With this, light received from the receiving portion can be effectively reflected in the third direction.

Moreover, it is preferable that the V-shaped cross-sections be isosceles triangles similar to each other across the first V-shaped groove in the second direction.

Moreover, it is preferable that a plurality of first V-shaped grooves including the first V-shaped groove be provided in a center region of the light guide plate in the first direction, and that the light guide plate further comprise a second V-shaped groove provided on the second surface at both outer sides of the plurality of first V-shaped grooves in the first direction and have a uniform cross-section along the second direction.

Moreover, it is preferable that the first V-shaped groove provided toward a center of the plurality of first V-shaped grooves in the first direction be formed to be deeper than the first V-shaped groove provided toward a periphery of the plurality of first V-shaped grooves in the first direction.

With this, the luminance distribution of the light guide plate is such that the luminance increases in the center not only in the second direction but in the first direction as well. Consequently, the luminance becomes concentric in a uniform region, and it is possible to achieve a luminance distribution in which luminance decreases as distance from the center increases.

Moreover, it is preferable that the depth of the first V-shaped groove be represented by a continuous function such that, when the depth of the first V-shaped groove at the center is expressed as h, an end depth h2 is less than or equal to (h−h/6).

With this, the amount of variation in depth of the first V-shaped groove in the second direction is made to be ⅙th with respect to the deepest depth. Consequently, it is possible to gradually decrease the luminance from the center to the periphery of the light guide plate in the second direction.

Moreover, it is preferable that a plurality of point light sources arranged in the second direction serve as a source of the light.

With this, even if point light sources, for example, are used as the light source, it is possible to achieve a luminance distribution in which luminance in the center is high and luminance in the periphery decreases as distance from the center increases.

Moreover, it is preferable that the light be incident from two side surfaces of the light guide plate which are opposite each other.

With this, it is possible to achieve a horizontally symmetrical luminance distribution in the first direction since a plurality of point light sources is arranged on both sides of the light guide plate in the first direction.

Moreover, to solve the foregoing problems, a die according to an embodiment of the present invention is a die for forming a V-shaped groove in a light guide plate according to Claim 1, and comprises: a second-surface forming face corresponding to a second surface of the light guide plate; and a first inverted V-shaped ridge extending in a second direction and corresponding to the first V-shaped groove in the light guide plate, wherein two boundary lines, formed by a meeting of the second-surface forming face with two surfaces forming the first inverted V-shaped ridge, slope towards each other from a center to an end of the first inverted V-shaped ridge along the second direction at a predetermined angle with respect to the second direction.

With this, a die corresponding to the first V-shaped grooves provided in plurality in the first direction and formed such that the first V-shaped grooves gradually become shallower in depth from the center toward both ends can be made.

Moreover, to solve the foregoing problems, a method of processing the die according to one of the embodiments of the present invention is a method of processing the die according to Claim 8, the method comprising: processing a V-shaped groove in a metal master plate capable of being plated, the V-shaped groove varying in depth in the second direction; depositing a thick plating on the metal master plate; removing the thick plating from the plated metal master plate; and fitting the removed thick plating to a predetermined die plate.

With this, it is possible to form the die with high accuracy since the inverted V-shaped ridge on the die is formed by depositing a thick plating on the metal master plate.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Embodiment 1

Here, the light guide plate according to the first embodiment of the present invention will be discussed with reference to FIG. 1 through FIG. 4. A light guide plate 1 is a plate used in an edge-lit backlight in an LCD display, for example, and designed to perform surface light emission by guiding light inward from a light source configured at the end of the light guide plate 1 and reflecting the light. The light guide plate 1 guides light radiated at the edge thereof inwards and reflects the light such that surface light emission is performed in the region (that is, the effective luminescent area) that is the display range of the LCD display.

Figure 1:
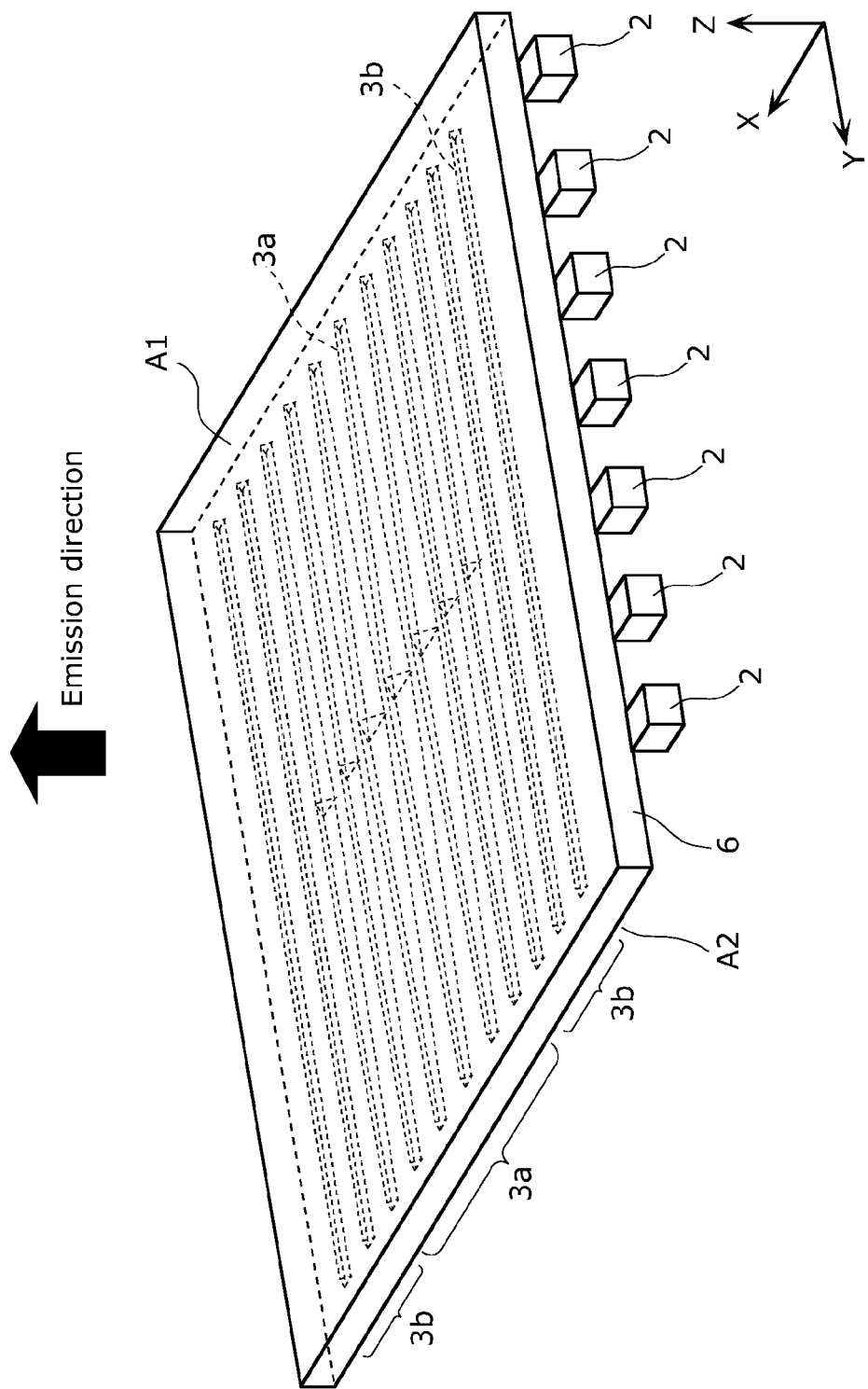
FIG. 1 is a perspective view of the light guide plate according to the first embodiment of the present invention.

FIG. 1 shows the light guide plate 1 according to an exemplary embodiment of the present invention. The light guide plate 1 is configured from: a first surface A1; a second surface A2 opposite the first surface A1; an LED 2 serving as a light source; a light receiving surface 6 serving as a receiving portion which receives light from the LED 2; a light guiding path Lp1 which guides, in a first direction parallel to the first surface A1 (or the second surface A2) (hereinafter referred to as x axis direction), light received from the light receiving surface 6; and a first prism groove 3a and a second prism groove 3b serving as an emitting portion which emits the light guided by the light guiding path Lp1, by reflecting the light towards the first surface A1 in a third direction perpendicular to the first surface A1 (hereinafter referred to as z axis direction). The light guiding path Lp1 is formed between the first surface A1 and the second surface A2.

The first prism groove 3a is a first V-shaped groove having a V-shaped cross-section provided in plurality on the second surface A2 side, and extends in a second direction (hereinafter referred to as y axis direction). The plurality of first prism grooves 3a are lined up in the x axis direction a provided in the center in the y axis direction. The first prism groove 3a is formed such that the depth D1 thereof in the y axis direction becomes shallower from the center toward both ends. In other words, the depth D1 of the first prism groove 3a is deepest at the center in the y axis direction, and shallowest at both ends in the y axis direction. Furthermore, the depth D1 of the first prism groove 3a monotonically decreases from the center of the first prism groove 3a to either end.

The second prism grooves 3b are provided on the side of the second surface A2 at both ends in the x axis direction. Each of the second prism grooves 3b has a V-shaped cross-section that is uniform throughout in the y axis direction. In other words, each of the second prism grooves 3b has a depth D2 that is uniform throughout in the y axis direction. A plurality of second prism grooves 3b (two in the first embodiment) are formed at each end of the light guide plate 1 in the x axis direction, away from the center of the light guide plate 1.

FIG. 2A is a plain view of the second surface A2 of the light guide plate 1. FIG. 2B is a cross-sectional view of the x-z plane of the second prism groove 3a and the second prism groove 3b. FIG. 2B shows a rising angle θ2 at which light is reflected in the z axis direction towards the first surface A1 serving as the light emitting surface, and the depth D1 of the first prism groove 3a (or the depth D2 of the second prism groove 3b). It is to be noted that in FIG. 2A, the first prism groove 3a and the second prism groove 3b are illustrated for showing the planar position and shape thereof, and that in FIG. 2B, the structure of the first prism groove 3a and the second prism groove 3b are shown in a common illustration since other than the width and depth, the cross-sectional shapes thereof are the same.

Figure 3:
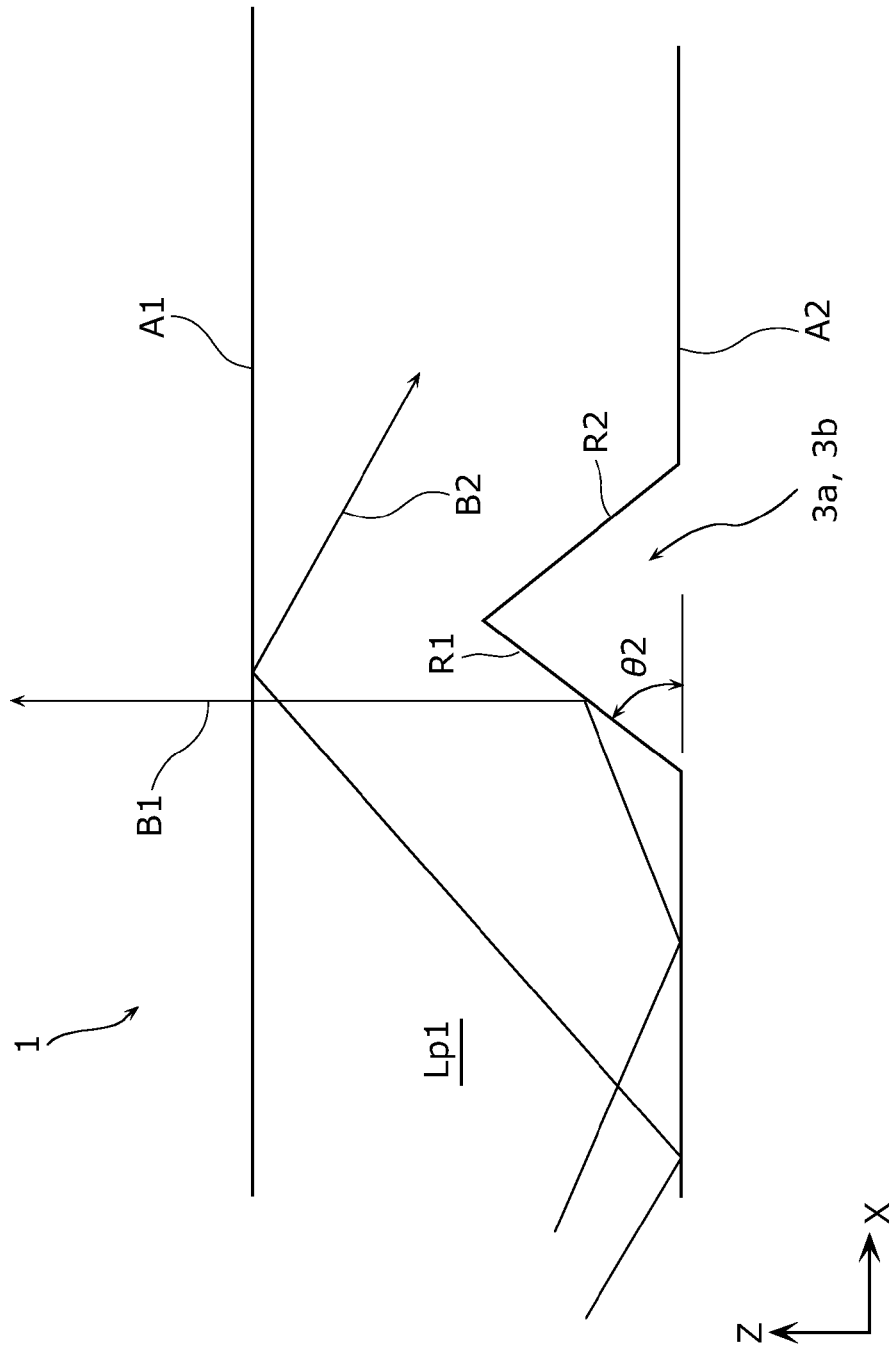
FIG. 3 is an enlarged view of a cross-section of the prism groove according to the first embodiment of the present invention.

FIG. 3 is an enlarged view of FIG. 2B showing an example a course of the light guiding path Lp1 in the light guide plate 1. FIG. 3 shows a path of light reflected by the first prism groove 3a and the second prism groove 3b in the z axis direction towards the first surface A1, and a path of light reflected off the second surface A2 and reflected once again off the first surface A1. As described above, the light guide plate 1 reflects light guided by the light guiding path Lp1 off the first prism groove 3a and the second prism groove 3b, and emits the light in the z axis direction, which is the emission direction, toward the first surface A1. Furthermore, the light guide plate 1 guides light to the sides of the light guide plate 1 in the y axis direction (that is, toward the sides opposite the light receiving surfaces 6) by totally reflecting light striking at a total reflection angle or greater with respect the first surface A1 and the second surface A2 (light ray B2) back internally off the first surface A1 and the second surface A2.

The light guide plate 1 is a quadrangular clear acrylic resin plate finished with an optical flat surface (the first surface A1) corresponding to the emission direction (z axis direction). Furthermore, the light guide plate 1 is finished with four optical flat surfaces perpendicular to the first surface A1, and 140 of the LEDs 2 are lined in a row at a predetermined distance from each other at a position 0.5 mm from one of the four planar surfaces (the light receiving surface 6). It is to be noted that the number of LEDs 2 actually provided is 140, and for the purpose of illustration, only seven of the LEDs 2 are shown in FIG. 1, FIG. 2, and FIG. 4. Moreover, similar to the first surface A1, the second surface A2 is also finished as an optical flat surface.

Light introduced into the light guide plate 1 from the light receiving surface 6 is guided to the opposite end of the light receiving surface 6 of the light guide plate 1 in the effective luminescent area in which an image is displayed on an LCD panel, repeatedly being totally reflected off at least one of the first surface A1 and the second surface A2 until being reflected by the first prism groove 3a or the second prism groove 3b. The first prism groove 3a and the second prism groove 3b are formed to be within the effective luminescent area of an LCD panel, and formed such that the rising angle θ2 of a reflecting surface R1 and a reflecting surface R2 which form the V-cross-section-shaped groove is 52 degrees with respect to the planar surface of the second surface A2. As shown in FIG. 3, a light ray B1 reflected off the second surface A2 is reflected by the reflecting surface R1, passing through the first surface A1 and being emitted in approximately the z axis direction. The greater the reflecting surface area of a portion of the reflecting surface R1, the greater the reflected luminance of that portion of the light guide plate 1. Regarding the reflecting surface R1 and the reflecting surface R2 forming first prism groove 3a and the second prism groove 3b, the reflecting surface R1 is formed on the light source side, and the reflecting surface R2 is formed on the opposite of the light source side.

The depth of the center of the plurality of first prism grooves 3a is such that the first prism groove 3a arranged in the middle in the x axis direction has the greatest depth, and the depth of the peripheral first prism grooves 3a decreases as distance from the center in the x axis direction increases. In other words, the depth of each of the plurality of first prism grooves 3a is different in the x axis direction as well, and the depth is greatest near the center. For example, the depth of the first prism groove 3a is represented by a continuous function such that, when the depth of the first V-shaped groove at the center is expressed as h, an end depth h2 is less than or equal to (h−h/6).

In this way, the greater the depth D2 of the first prism groove 3a, the greater the surface area of the reflecting surface R1 and R2 becomes, and the shallower the depth D2, the smaller the surface area of the reflecting surface R1 and R2 becomes. As such, the luminance of the light emitted after being reflected by the first prism groove 3a arranged in the middle is high, and the luminance of the light emitted after being reflected by the first prism groove 3a arranged away from the middle is low. For this reason, the plurality of first prism grooves 3a can emit light such that the luminance near the center of the light guide plate 1 is high while the luminance gradually decreases as distance from the center area increases.

Figure 4A:
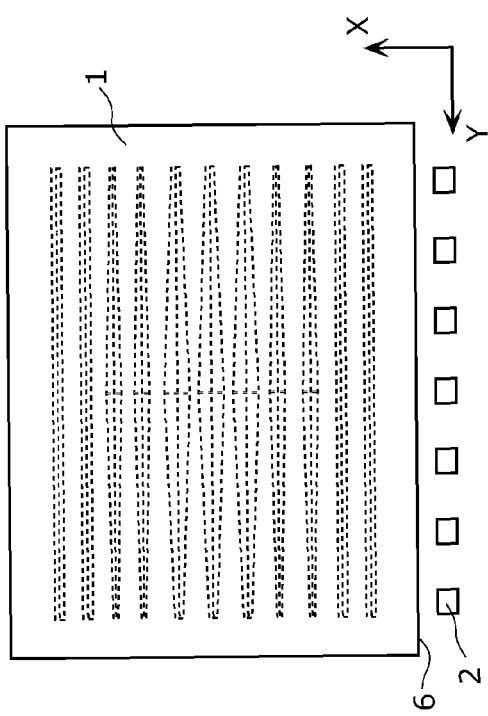
FIG. 4A is a plan view of the light guide plate from the perspective of the emitting surface according to the first embodiment of the present invention.
Figure 4B:
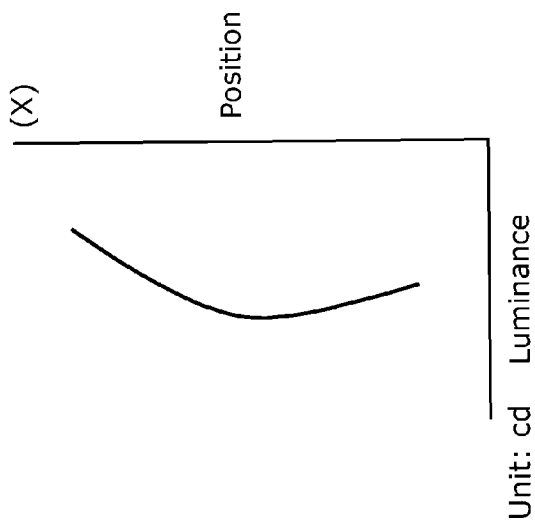
FIG. 4B shows the luminance distribution in an x axis direction according to the first embodiment of the present invention.
Figure 4C:
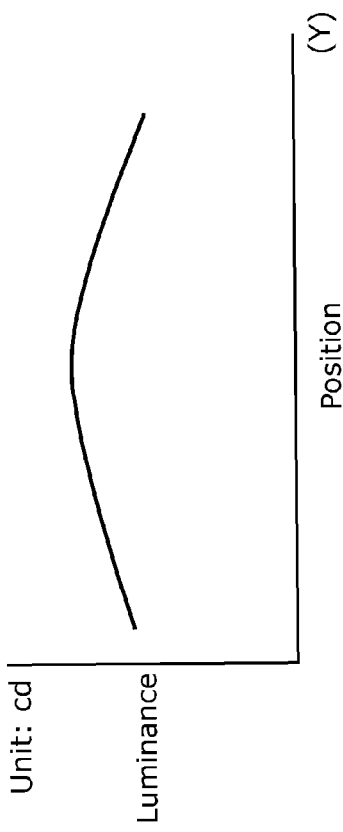
FIG. 4C shows the luminance distribution in a y axis direction according to the first embodiment of the present invention.

The pitch in the x axis direction formed by the plurality of first prism grooves 3a and the plurality of second prism grooves 3b (that is, the distance between each of the plurality of first prism grooves 3a and the plurality of second prism grooves 3b) is a consistent 500 μm. The depth of the first prism groove 3a varies from 4 μm to 70 μm depending on the first prism groove 3a. It is to be noted that with groove depths below 4 μm, the margin of error exceeds 10% due to the manufacturing margin of error being 0.4 μm, causing the margin of error in the distribution of luminance to increase. Moreover, when the groove depth is 70 μm or greater, groove processing time becomes lengthy. As such, taking into consideration the balance of manufacturing costs and optical luminance design distribution, depths of 70 μm and below are suitable. In the end portion of the first prism groove 3a in the y axis direction (or the end portion of the second prism groove 3b in the x axis direction), the surface area of the reflecting surface R1 and R2, which are for reflecting and emitting light towards the first surface A1 in the z axis direction, is set to 4 μm or greater as a bare minimum. In other words, it is necessary for the reflecting surface to have a depth of 4 μm at the very least in order to emit light in the z axis direction FIG. 4A is a plain view of the first surface A1 of the light guide plate 1. FIG. 4B shows the luminance distribution in the x axis direction when luminance is measured by a luminance meter from the side of the first surface A1 shown in FIG. 4A. FIG. 4C shows the luminance distribution in the y axis direction when luminance is measured by a luminance meter from the side of the first surface A1 shown in FIG. 4A.

As the results show, when light from the LED 2 is introduced into the light guide plate 1, the luminance distribution in the x axis direction has a peak in the middle, as is shown in FIG. 4B. This is due to the depth of the first prism grooves 3a at a given position in the y axis direction is such that the depth in the x axis direction is the greatest in the center and decreases from the center proceeding toward the ends of the light guide plate 1. With this configuration, the surface area of a unit range of the reflecting surface R1 in the y axis direction can be made to be greater in the center in the x axis direction, and the surface area of a unit range of the reflecting surface R1 in the y axis direction can be made to be smaller at the ends in the x axis direction. For this reason, a luminance distribution having a peak in the center such as is shown in FIG. 4B can be achieved.

Similarly, when light from the LED 2 is introduced into the light guide plate 1, the luminance distribution in the y axis direction has a peak in the middle, as is shown in FIG. 4C.

This is due to the depth of the first prism groove 3a being the greatest in the center in the y axis direction and decreasing toward the ends of the first prism groove 3a. With this configuration, in each of the first prism grooves 3a, the surface area of the reflecting surface R1 in the center in the y axis direction can be made to be greater, and the surface area of the reflecting surface R1 in toward the ends in the y axis direction can be made to be smaller. For this reason, a luminance distribution having a peak in the center such as is shown in FIG. 4C can be achieved.

Moreover, by forming, in the end portions of the light guide plate 1 in the x axis direction, the second prism groove 3b that is a parallel groove having a uniform V-shaped cross-section, the periphery of the light guide plate 1 is made to not have a luminance distribution having a peak like that seen in FIG. 4B and FIG. 4C, but is made having a uniform luminance distribution. The ratio of the depth of the first prism groove 3a to the second prism groove 3b is not uniform, but is determined in order to increase the luminance in the center. The second prism grooves 3b are provided in the vicinity of an area that covers 20% of the length of light guide plate 1 from each of the two ends of the light guide plate 1 in the x axis direction. The depth of the second prism grooves 3b can be set according to a controlled variable of luminance. Moreover, the first prism grooves 3a are provided in an area outside of the area that covers 20% from each of the two ends of the light guide plate 1 so as to increase the luminance in the center of the light guide plate 1. It is to be noted that an area covering 20% of the light guide plate 1 from each of the two ends is preferable because the region in which raising the central luminance is desired is a region that covers about 10% of the center of the length of the light guide plate 1. Consequently, it is not necessary to form the first prism groove 3a such that the groove reaches the end of the light guide plate 1. By forming the first prism groove 3a from an area that covers 20% of the two ends of the light guide plate 1, a steep change in luminance is avoided and a smooth transition to a high luminance area in the center is achieved.

It is to be noted that, according to the first embodiment, a completely symmetrical luminance distribution is not achieved since the LEDs 2 are only provided on one side of the light guide plate 1 and light from only one direction is controlled. However, as noted above, by providing and optimizing the depth of the first prism groove 3a and the second prism groove 3b, it is possible to achieve a luminance distribution in which luminance in the center is high and luminance in the periphery decreases as distance from the center increases. In other words, the luminance becomes concentric in a uniform region, and it is possible to achieve a luminance distribution in which luminance decreases as distance from the center increases. With this, the amount of light from the light source can be decreased without generating a loss in image quality to the extent possible.

It is to be noted that, like the conventional technique shown in FIG. 15, even if a ridge prism is formed perpendicular to the reflecting surface on the light guide plate 1 to reduce luminance inconsistency of light from the light source side in the x axis direction, the prism groove effectiveness of raising the luminance in the center of the reflecting surface can still be achieved. In this case, it is preferable to design the depth of the prism groove on the reflecting surface side to optimize the refraction and the reflecting conditions in the prism on the emitting surface side.

Embodiment 2

Figure 5:
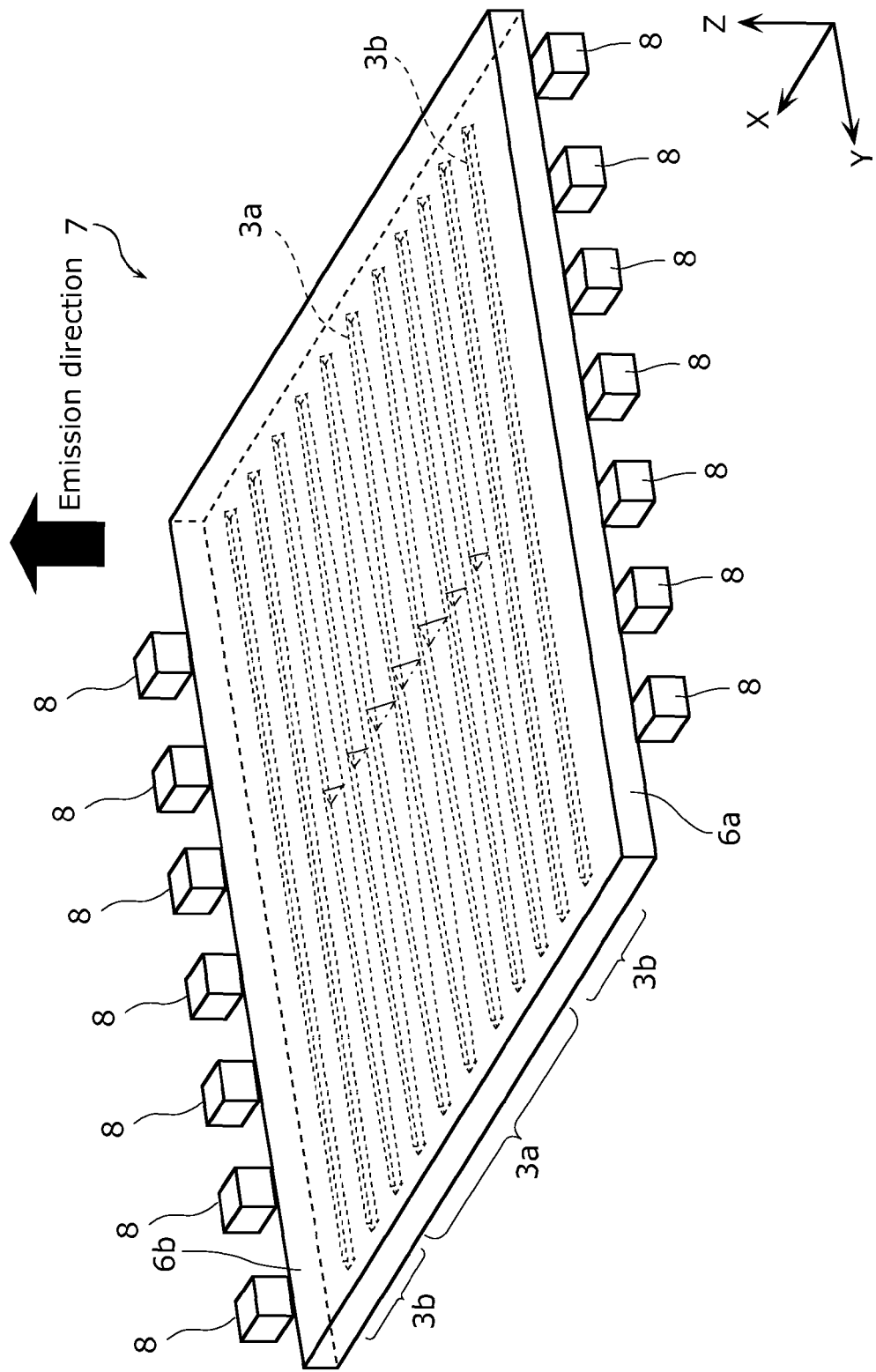
FIG. 5 is a perspective view of the light guide plate according to the second embodiment of the present invention.
Figure 6A:
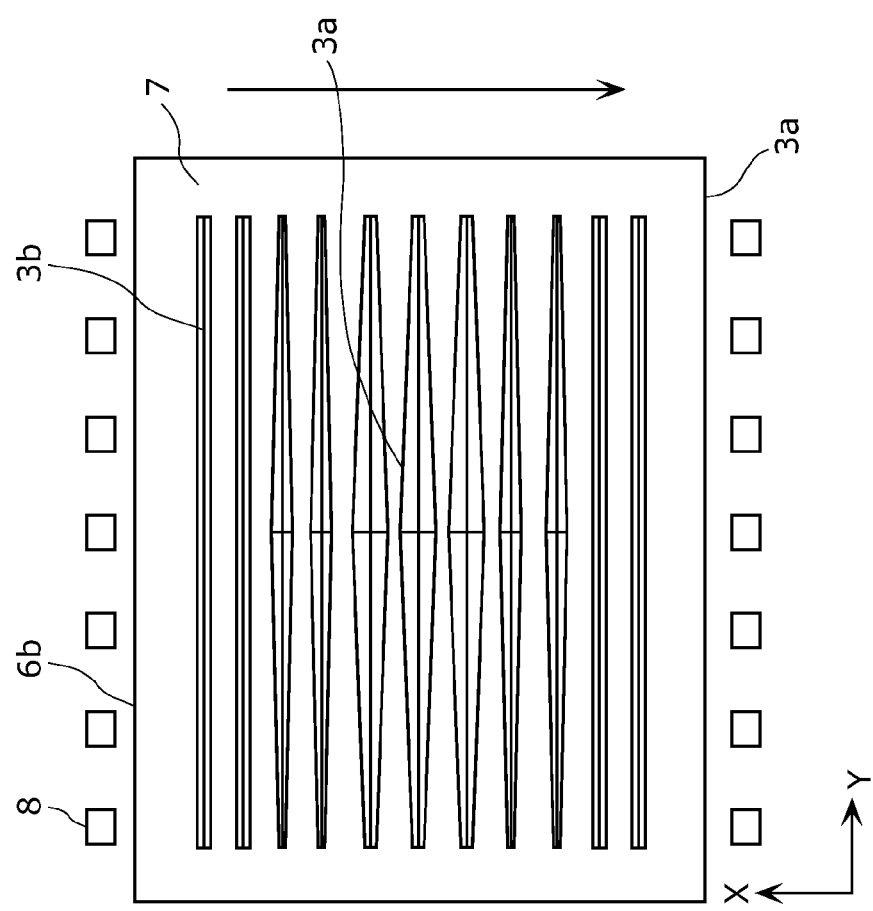
FIG. 6A is a plan view of the light guide plate according to the second embodiment of the present invention.
Figure 6B:
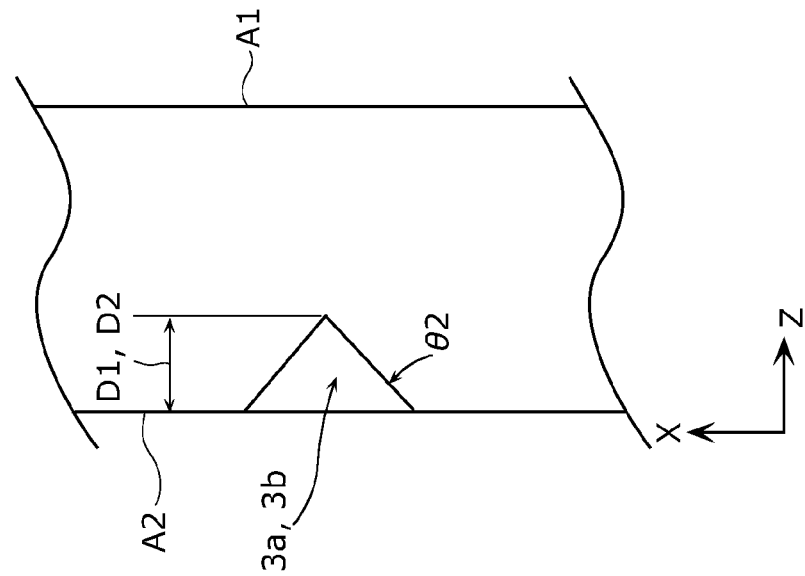
FIG. 6B is a cross-section of the prism groove according to the second embodiment of the present invention.

Here, a light guide plate 7 according to the second embodiment of the present invention will be discussed with reference to FIG. 5 through FIG. 7. The light guide plate 7 according to the second embodiment is different from the light guide plate 1 according to the first embodiment only in that the light guide plate 7 is provided with (i) a plurality of LEDs 8 as a light source on both sides of the light guide plate 7 in the x axis direction, and (ii) a light receiving surface 6a and a light receiving surface 6b opposite the light receiving surface 6a which introduce light from both ends in the x axis direction. As such, all other commonalities will be omitted from the description of the light guide plate 7.

The light guide plate 7 is finished with four optical flat surfaces perpendicular to the first surface A1, and 70 light emitting diodes are lined in a row at a predetermined distance from each other at a position 0.5 mm from one of the four planar surfaces (the light receiving surface 6a). 70 light emitting diodes are lined in a row at a predetermined distance from each other at a position 0.5 mm from the light receiving surface 6b opposite the light receiving surface 6a. It is to be noted that the number of LEDs 8 actually provided on one side is 70, and for the purpose of illustration, only seven of the LEDs 8 are shown on one side in FIG. 5, FIG. 6, and FIG. 8.

As shown in FIG. 7, light introduced into the light guide plate 7 from the light receiving surface 6a and 6b (light rays B3 through B6) is guided in the effective luminescent area in which an image is displayed on an LCD panel, repeatedly being totally reflected off at least one of the first surface A1 and the second surface A2 until being reflected by the first prism groove 3a or the second prism groove 3b. It is to be noted that in FIG. 7 the light ray B3 and the light ray B4 represent light rays which have been reflected by the first prism groove 3a or the second prism groove 3b, while the light ray B5 and the light ray B6 represent light rays which have been guided by being repeatedly totally reflected off at least one of the first surface A1 and the second surface A2. The first prism groove 3a and the second prism groove 3b are formed to be within the effective luminescent area of an LCD panel, and formed such that the rising angle θ2 of the reflecting surface R1 and the reflecting surface R2 which form the V-cross-section-shaped groove is 52 degrees with respect to the planar surface of the second surface A2. As shown in FIG. 7, the light ray B3 introduced via the light receiving surface 6a and reflected off the second surface A2 is reflected by the reflecting surface R1, passing through the first surface A1 and being emitted in approximately the z axis direction. Moreover, the light ray B4 introduced via the light receiving surface 6b opposite the light receiving surface 6a and reflected off the second surface A2 is reflected by the reflecting surface R2 opposite the reflecting surface R1, passing through the first surface A1 and being emitted in approximately the z axis direction. The greater the reflecting surface area of a portion of the reflecting surface R1 and the reflecting surface R2, the greater the reflected luminance of that portion of the light guide plate 1.

Figure 8B:
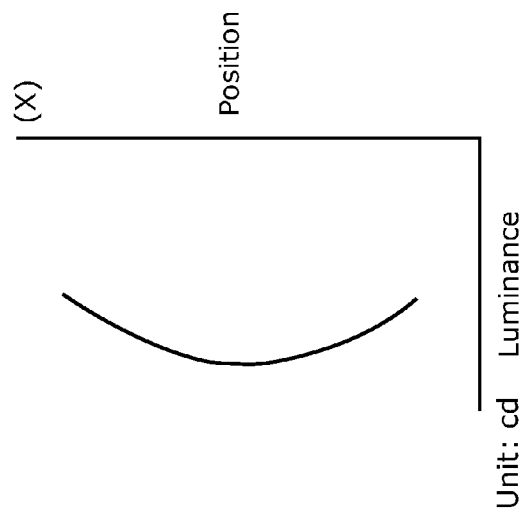
FIG. 8B shows the luminance distribution in an x axis direction according to the second embodiment of the present invention.
Figure 8A:
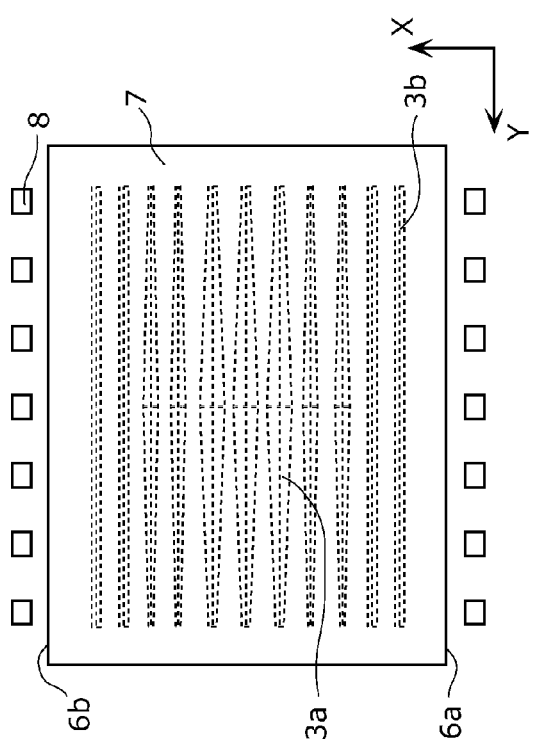
FIG. 8A is a plan view of the light guide plate from the perspective of the emitting surface according to the second embodiment of the present invention.
Figure 8C:
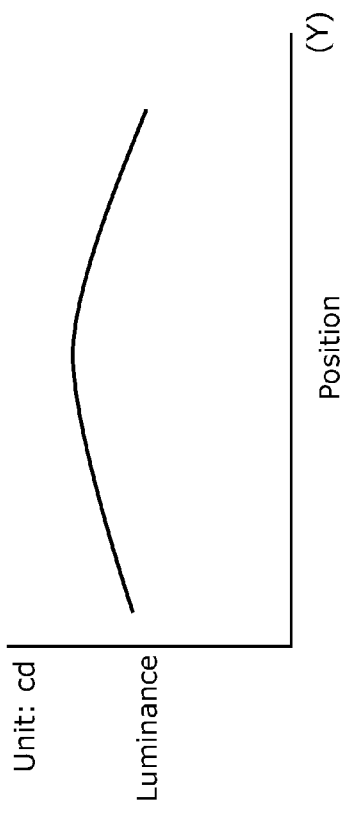
FIG. 8C shows the luminance distribution in a y axis direction according to the second embodiment of the present invention.

FIG. 8A is a plain view of the first surface A1 of the light guide plate 7. FIG. 8B shows the luminance distribution in the x axis direction when luminance is measured by a luminance meter from the side of the first surface A1 shown in FIG. 8A. FIG. 8C shows the luminance distribution in the y axis direction when luminance is measured by a luminance meter from the side of the first surface A1 shown in FIG. 8A.

As the results show, when light from the LED 8 is introduced into the light guide plate 7, the luminance distribution in the x axis direction has a peak in the middle, as is shown in FIG. 8B. Moreover, since the LED 8 is provided in plurality on both sides of the light guide plate 7 in the x axis direction, the light distribution characteristic of the light from both sides is controlled, resulting in a horizontally symmetrical luminance distribution. Similar to the light guide plate 1, when light from the LED 8 is introduced into the light guide plate 7, the luminance distribution in the y axis direction has a peak in the middle, as is shown in FIG. 8C.

As shown by the luminance distribution in both directions, the luminance is elliptically distributed having a peak in the center. With this, the amount of light from the light source can be decreased without generating a loss in image quality.

Embodiment 3

Figure 9B:
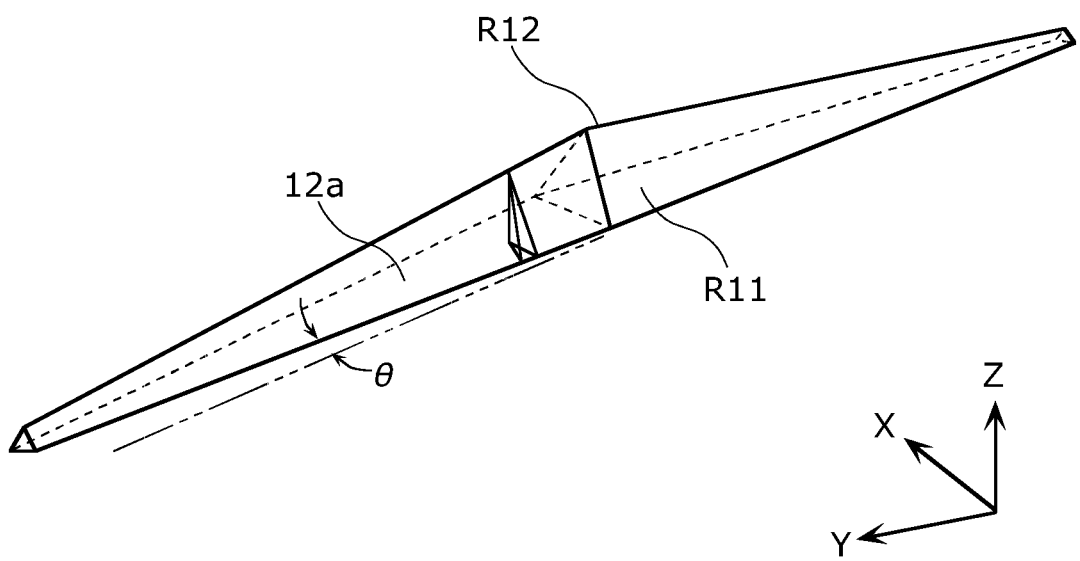
FIG. 9B is a perspective view of the prism ridge according to the third embodiment of the present invention.

Here, a die according to the third embodiment of the present invention for manufacturing the light guide plate will be discussed with reference to FIG. 9A, FIG. 9B, FIG. 10A through FIG. 10F, and FIG. 11. FIG. 9A shows a die insert 13 according to the third embodiment for manufacturing the light guide plate 1 and light guide plate 7. Formed on the die insert 13 is a prism ridge 12a and prism ridge 12b for forming the prism groove 3a and prism groove 3b on the light guide plate 1 and light guide plate 7. The surface on which the prism ridge 12a and prism ridge 12b are formed is a mirror finished surface. The die insert 13 is formed by depositing a nickel-phosphorus alloy plating or a copper plating on a stainless alloy workpiece. The thickness of the die insert 13 (not including the prism ridge 12a and the prism ridge 12b) is about 50 μm thicker than the height of tallest prism ridge 12a and prism ridge 12b.

Since the plating layer has a flatness of 30 μm, it is possible to achieve a flatness of 1 μm or less by precession processing a working amount of 50 μm to preserve the flatness of the optical flat surface. The prism ridge 12a and the prism ridge 12b are formed as uncut portions as a result of directly machining the die insert 13.

FIG. 9B is a perspective view of the prism ridge 12a. As shown in FIG. 9B, the prism ridge 12a is formed to have a gradient of the angle θ with respect to the y axis direction.

Figure 10A:
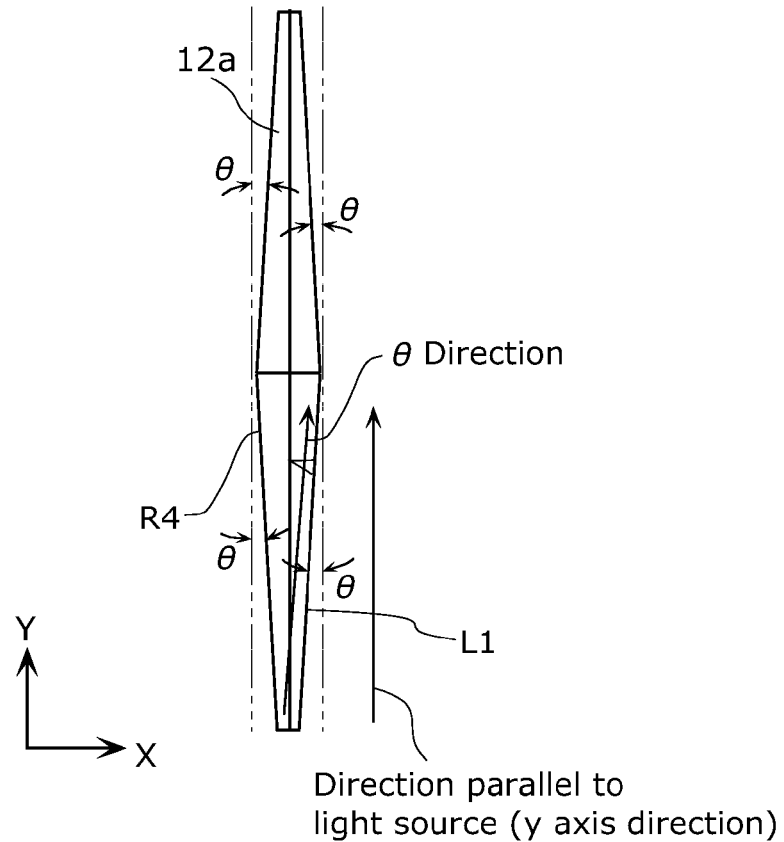
FIG. 10A is a plan view of one of the prism ridges according to the third embodiment of the present invention.

FIG. 10A is a view of the prism ridge 12a from above. The prism ridge 12a includes a reflecting-surface forming face R11 and a reflecting-surface forming face R12 (see FIG. 9B), which slope at an angular degree of θ (hereinafter referred to as the θ direction), for forming the reflecting surface 21 and the reflecting surface R2. That is, a straight line L1 and a straight line L4, which are boundary lines between a second-surface forming face A12 (which is for forming the second surface A2 on the light guide plate 1 and light guide plate 7) and the respective reflecting-surface forming faces R11 and R12, slope at an angle θ with respect to the y axis direction. The straight line L1 and the straight line L4 lope towards each other from the center out towards the ends of the prism ridge 12a along the y axis direction at the angle θ with respect to the y axis direction.

Figure 10B:
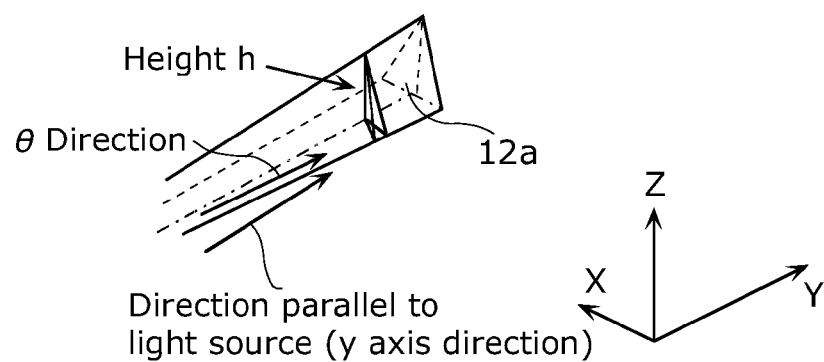
FIG. 10B is a perspective view of a portion of the prism ridge according to the third embodiment of the present invention.

FIG. 10B is a perspective view of a portion of the prism ridge 12a. The prism ridge 12a has a height h at a predetermined position in the y axis direction.

Figure 10C:
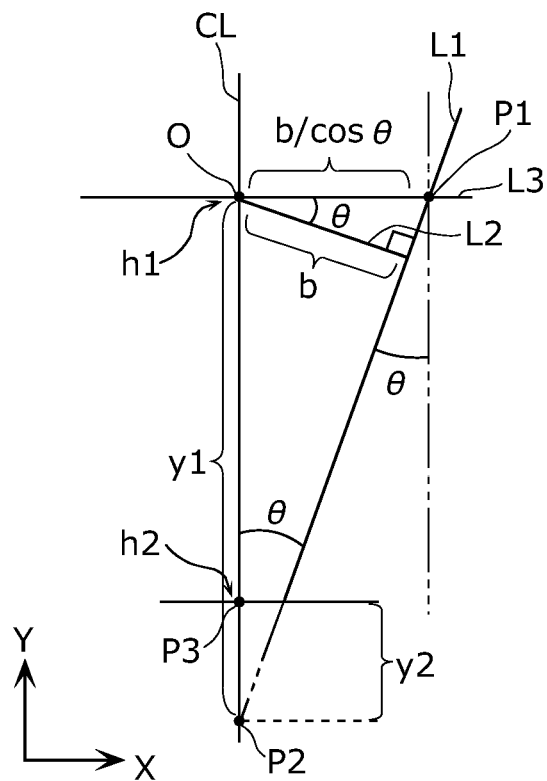
FIG. 10C is a plan view of a quarter quadrant of the prism ridge according to the third embodiment of the present invention.

FIG. 10C is an enlarged outline view of a fourth quadrant portion of the prism ridge 12a when viewed from above (in other words FIG. 10A) when the center point O of the prism ridge 12a is designated to be the point of origin in the x axis direction and y axis direction. In the prism ridge 12a, a straight line L2 crosses through the center point O and is perpendicular to the straight line L1 having a slope with respect to the y axis direction. The straight line L2 has a length b from the center point O to a point at which it intersects the straight line L1. For this reason, half of the width of the prism ridge 12a in the x axis direction (in other words, the distance from the center point O to the intersection point P1 at the intersection of the straight line L1 and the straight line L3 which is parallel to the x axis direction and passes through the center point O) is represented as b/cos θ.

Figure 10D:
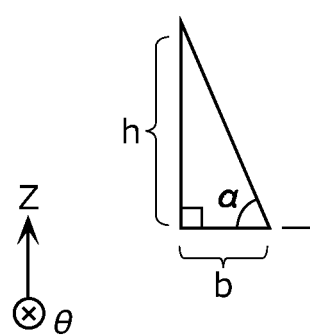
FIG. 10D is a cross-sectional view of the prism ridge from the direction θ according to the third embodiment of the present invention.

FIG. 10D is a cross-sectional view corresponding to the straight line L2 at a right angle to the θ direction, and the z axis direction. In this cross-sectional view, the angle between the hypotenuse, which is the reflecting-surface forming face R11, and the x axis direction is represented as the tool angle α, the height of the prism ridge 12a is represented as h, and as designated in FIG. 10C, the base of the right triangle in this cross-sectional view is represented as b. Equation 1 expresses their relationship.

$$h = b \cdot \tan \alpha \quad \text{(Equation 1)}$$

Figure 10E:
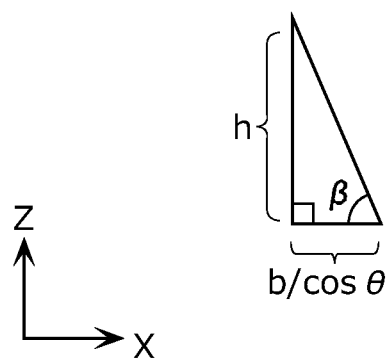
FIG. 10E is a cross-sectional view of the prism ridge from the y axis direction according to the third embodiment of the present invention.

FIG. 10E is a cross-sectional view corresponding to the straight line L3 extending in the x axis direction and passing through the center point O, and the z axis direction. In this cross-sectional view, the angle between the hypotenuse, which is the reflecting-surface forming face R11, and the x axis direction is represented as the reflection angle β, the height of the prism ridge 12a is represented as h (as already designated in FIG. 10C and FIG. 10D), and the base of the right triangle in this cross-sectional view is b/cos θ. Equation 2 expresses their relationship.

$$h = (b/\cos \theta) \cdot \tan \beta \quad \text{(Equation 2)}$$

The tool angle α is obtained with Equation 3 using Equation 1 and Equation 2.

Math 1

$$\alpha = \tan^{-1}\left(\frac{\tan \beta}{\cos \theta}\right) \quad \text{(Equation 3)}$$

It is to be noted that in FIG. 10C, when y1 represents the distance between the center point O and an intersection point P2 of the straight line L1 and a center line CL which is parallel to the y axis direction and passes through the center point O, the previously mentioned distance b is obtained with Equation 4.

$$b = y1 \cdot \sin \theta \quad \text{(Equation 4)}$$

When the end of the center line CL of the prism ridge 12a is represented as P3, and the height of the prism ridge 12a at the center point O (that is, the distance in the z axis direction) is represented as h1, the height h1 is obtained with Equation 5.

$$h1 = b \cdot \tan \alpha \quad \text{(Equation 5)}$$

Moreover, h1 is obtained with Equation 6 using Equation 4 and Equation 5.

$$h1 = y1 \cdot \sin \theta \cdot \tan \alpha \quad \text{(Equation 6)}$$

Moreover, when the height of the prism ridge 12a at the end P3 (that is, the distance in the z axis direction) is represented as h2, and the ratio of the height h1 to the height h2 is represented as γ, their relationships are obtained with Equation 7.

$$h1 = \gamma \cdot h2 \quad \text{(Equation 7)}$$

Here, the proportional relationships of the height h1 and the distance y1, and the height h2 and the distance y2 share the same coefficient γ. Thus, the relationship between the distance y1 and the distance y2 can both be expressed using the coefficient γ in Equation 8.

$$y1 = \gamma \cdot y2 \quad \text{(Equation 8)}$$

The relationship of the distance y1 and the distance y2 with half the light emitting range L of the light guide plate in the y axis direction is shown in Equation 9.

$$(y1-y2)=L/2 \quad \text{(Equation 9)}$$

Figure 11:
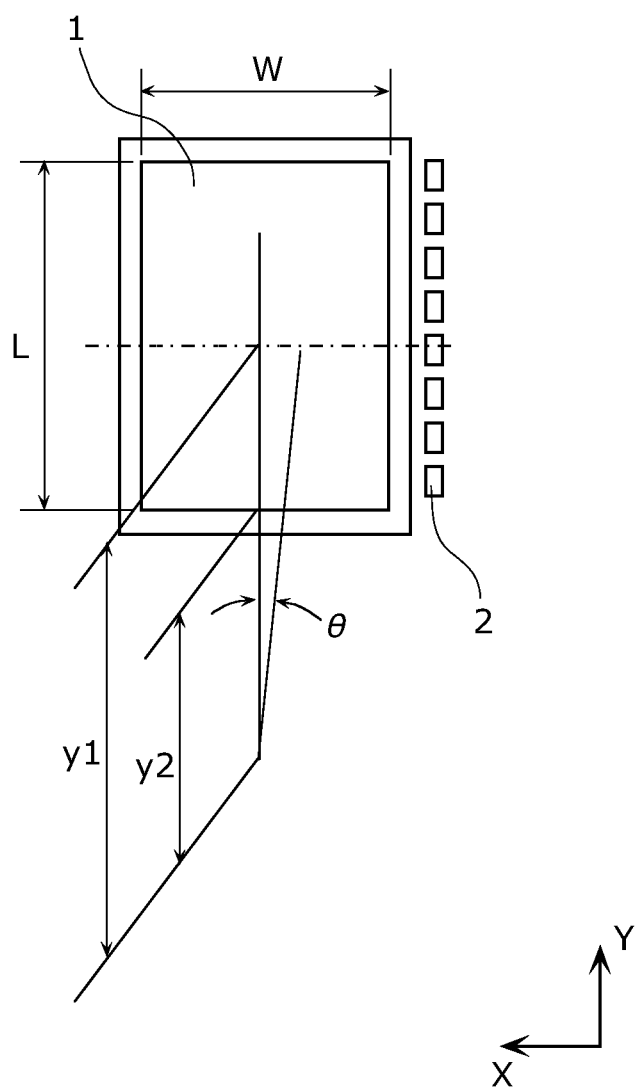
FIG. 11 is a drawing showing the relationship of the effective luminescent area of the light guide plate and the size of the prism ridge light according to the third embodiment of the present invention.

FIG. 11 is a plain view of the entire light guide plate 1 in the x-y plane. As is shown in FIG. 11, defined are the LED 2 which introduce light into the light guide plate 1, the effective luminescent area of the light guide plate 1, the angle θ at which the reflecting surface of the prism is sloped, the distance y1 from the point at which the θ sloped line and the prism ridge 12a center line intersect, to the center of the light guide plate 1, and the distance y2 from the point at which the sloped line and the prism ridge 12a center line intersect, to the effective luminescent area of the light guide plate 1.

Based on this, in order to obtain the angle θ, if one supposes that the angle θ shown in Equation 3 is initially a value as close to 0 as possible, then α=β in Equation 3. Consequently, the angle θ is calculated for by supposing that the tool angle α is equal to the reflection angle β which is used in the optical design.

Equation 10 is derived by inserting Equation 8 into Equation 9.

$$(\gamma \cdot y2 - y2) = L/2 \quad \text{(Equation 10)}$$

When the distance y2 is derived from Equation 10, the distance y2 is represented as such in Equation 11.

$$y2 = (L/2)/(\gamma - 1) \quad \text{(Equation 11)}$$

Moreover, Equation 12 is derived from Equation 6, Equation 7, and Equation 8.

$$h2 = y2 \cdot \sin\theta \cdot \tan\alpha \quad \text{(Equation 12)}$$

When the angle θ is obtained from Equation 11 and Equation 12, the angle θ is represented as such in Equation 13.

Math 3

$$\theta = \sin^{-1}\frac{h2 \cdot (\gamma - 1)}{(L/2)/\tan\alpha} \quad \text{(Equation 13)}$$

Next, a specific design example will be explained using these Equations. The prism ridge 12a shown in FIG. 10B is processed such that the height h of one of the prism ridges 12a increases towards the center. In order to accomplish this, the straight line L1 and the straight line L4, which are, as shown in FIG. 10A, boundary lines between the second-surface forming face A12 and respective reflecting-surface forming faces R11 and R12, are processed to slope at an angle θ with respect to the y axis direction when viewing the light emitting surface forming die face from a planar perspective. Then, the prism ridge 12a is formed having a slope of the angle θ so as to be symmetrical about the straight line L3 which is the center of the light guide plate 1, as well as symmetrical about the center line CL. By processing the prism ridge 12a in this way, the height of the ends of the prism ridges 12a formed on the end portion of the light guide plate 1 is the greatest in the center portion of the light guide plate 1. Because the angle β of the reflecting surface of the prism geometry is processed to be approximately 52 degrees, the tool angle α (bit angle) in the third embodiment is set to 52 degrees. The relationship of the reflection angle β and the tool angle α is expressed in Equation 3, and is determined by the angle θ as seen from a planar view. Regarding the angle θ, the height h2 of the prism on the light guide plate 1 at the end P3 is designed to be 10 μm, the height h1 of the prism on the light guide plate 1 at the center point O is designed to be 50 μm, the scaling factor γ of the height of the prism at the center and the end of one prism ridge 12a is designated to be 5, the length L of the light emitting surface area (that is, the effective luminescent area) of the light guide plate 1 in the y axis direction is designated to be 800, the length W of the same in the x axis direction is designated to be 450. Here, when α is set to be equal to β in order to yield an angle θ of less than 0.1 degrees, the sloping angle θ from a planar perspective can be obtained with Equation 13 based on the light guide plate size, the height h2 of the prism on the light guide plate 1 at the end P3, the height h1 of the prism on the light guide plate 1 at the center point O, and the tool angle α.

When the length L of the effective luminescent area of the light guide plate 1 in the y axis direction is 800 mm, the height h2 of the prism on the end of the light guide plate 1 is 0.01 mm, the height scaling factor γ of the center prism is 5, and the tool angle α is 52 degrees, the angle θ is calculated to be 0.0045 degrees using Equation 13. Using this angle θ, a desired prism ridge geometry can be formed via manufacturing with precision machinery using a diamond tool having a 76 degree tip which can form the rising angle θ2 to be 52 degrees. When the pitch (distance) between the prisms is 0.5 mm, it is preferable that the application range of the angle θ be 10 degrees or less. It is to be noted that when the angle θ is 10 degrees or more, the size of the light guide plate capable of being manufactured decreases due to interference by the prism.

From the perspective of reflection efficiency and processing time, it is preferable that the die insert 13 be designed such that the rising angle θ2 is from 45 to 60 degrees, the height h is from 4 to 100 μm, and the tool angle α is from 45 to 60 degrees. In particular, if the rising angle θ2 and the tool angle α which processes the rising angle θ2 are such that the angle θ2 in the light guide plate 1 is less than 45 degrees, the reflecting angle becomes obtuse, reflection of light towards the emission direction within a ±5 degree range from the light guide plate emitting surface is practically non-existent. Moreover, when the rising angle θ2 exceeds 60 degrees, the amount of light that passes through the prism groove 3a becomes excessive, and reflection of light towards the emission direction within a ±5 degree range from the emitting surface of the light guide plate 1 is practically non-existent, and as a result, luminance on the surface with respect to the light emitting surface does not increase. For this reason, the rising angle θ2 is designed to be within a range from 45 degrees to 60 degrees.

The light guide plate according to either of the first or second embodiments is manufactured by designing the light guide plate in this manner, setting the processed die insert 13 in the die, and forming an acrylic material with an injection molding process. Accordingly, it is possible to process the prism high with a high degree of accuracy, and in the luminance distribution of the light emitted from the light guide plate, it possible to increase the luminance in the vicinity of the center of the light guide plate formed with the die.

Embodiment 4

Here, the forth embodiment of the present invention will be discussed with reference to FIG. 12A, FIG. 12B, and FIG. 13.

Figure 12A:
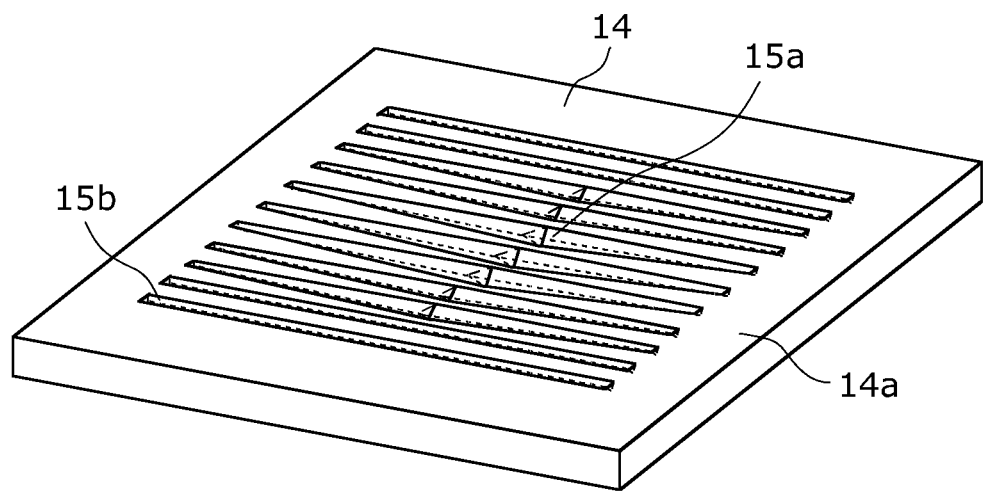
FIG. 12A is a perspective view of the die plate which forms the prism grooves according to the fourth embodiment of the present invention.

FIG. 12A shows a metal master plate 14 for forming the prism groove 3a and prism groove 3b in the second surface A2 on the light guide plate 1. The metal master plate 14 forms grooves which match the ridges on the die. In other words, the metal master plate 14 is formed as a die having the same geometry as the light guide plate 1.

Figure 12B:
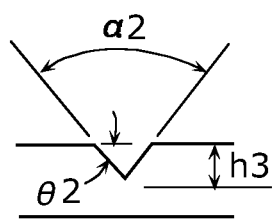
FIG. 12B is a cross-section of a prism groove on the die plate according to the fourth embodiment of the present invention.

FIG. 12B shows a cross-section of the prism groove 15a and the prism groove 15b at a right angle with respect to the processing direction. In other words, FIG. 12B is a cross-sectional view of the x-z plane of the prism groove 15a and the prism groove 15b. Depicted here is the depth h3 of the prism groove 15a and the prism groove 15b, the rising angle θ2 of the reflecting surface of the reflecting surface prism groove, and the processing tool vertex angle α2.

Figure 13A:
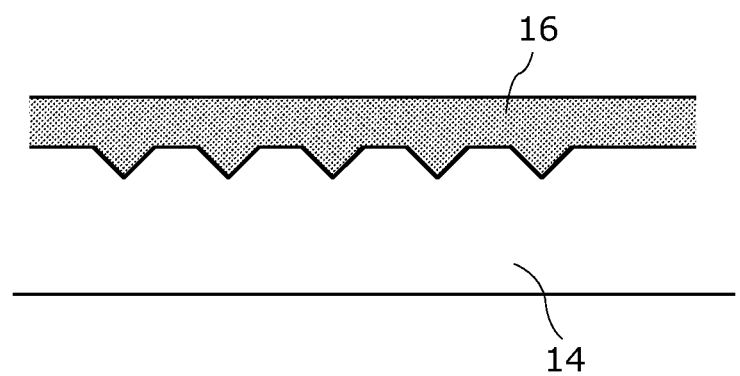
FIG. 13A is a phase diagram of the electrolytic nickel plating according to the fourth embodiment of the present invention.
Figure 13B:
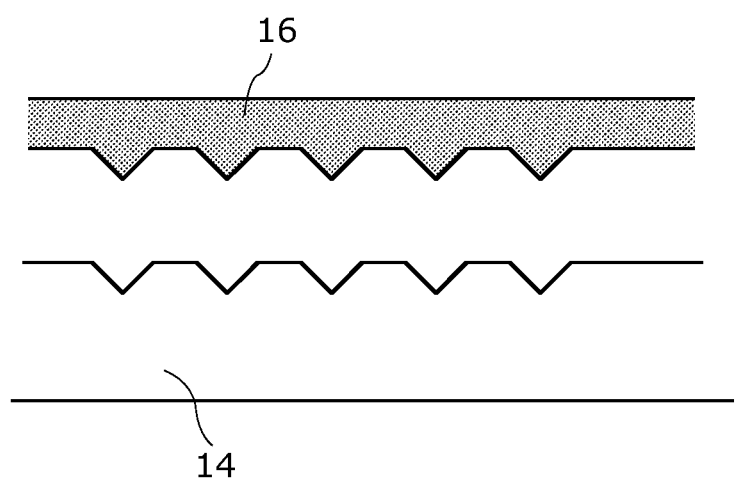
FIG. 13B shows the removal of the electrolytic nickel plating according to the fourth embodiment of the present invention.

FIG. 13A shows a non-electrolytic nickel plating (non-electrolytic nickel layer 16) deposited on the surface of the metal master plate 14. FIG. 13B shows the non-electrolytic nickel layer 16 removed from the metal master plate 14.

The surface layer forming the prism groove 15a and the prism groove 15b on the metal master plate 14 is a deposit of a non-electrolytic nickel plating or a copper plating. The plated surface 14a is processed with a diamond bit such that the reflecting surface, which is an optical flat surface on the formed light guide plate 1, has a surface roughness of 50 nm or less. The depth of the plated surface 14a processed in this manner is adjusted by processing the grooves such that, similar to the light guide plate 1 shown in FIG. 12B, the depth of a prism groove 15a on the metal master plate 14 having a rising angle θ2 of 52 degrees is the deepest in the center region of the light guide plate. In this groove processing, a plurality of grooves are formed within the effective luminescent area of the light guide plate such that the reflecting surface area of the light (that is, the area of the surface that reflects light in the emission direction) is higher in the middle of the light guide plate in order to achieve a luminance distribution in which the luminance increases at the center of the light guide plate. The prism grooves 15a and the prism grooves 15b are processed with a diamond bit having a vertex angle α2 of 76 degrees such that the surface roughness of the optical reflecting surface is 50 nm or less. This is preferable because, by making the optical flat surface 50 nm or less, the amount of scattered light will be decreased. As a master pattern, the metal master plate 14 processed as shown in FIG. 13A undergoes mold release treatment, and then an electrolytic nickel plating is deposited on the mold release treated surface. The thickness of plating layer of the electrolytic nickel plating is within a range from 300 μm to 700 μm. As is shown in FIG. 13B, after completion of the electrolytic nickel plating, the non-electrolytic nickel layer 16 is removed from the master pattern metal master plate 14. The prism ridge shapes necessary to form the grooves on the light guide plate are transferred to the removed non-electrolytic nickel layer 16. A nickel plate formed from the non-electrolytic nickel layer 16 having a thickness within a range from 300 μm to 700 μm is attached to a die for injection molding. The reason for making the thickness of the non-electrolytic nickel layer 16 from 300 μm to 700 μm is because the thicker the non-electrolytic nickel layer 16 is, the longer the plating process takes, thereby increasing costs. This thickness allows for the flatness of the forming surface to be secured when attaching it to a die, and is the bare minimum thickness at which the rigidity can be secured. The light guide plate 1 and the light guide plate 7 according to the first and second embodiments are manufactured using acrylic as the injection molding material. Due to the depth of one of the prism groove 3a and the prism groove 3b formed on the second surface A2 being the deepest in the center region of the light guide plate, it is possible for the injection molded light guide plate 1 and light guide plate 7 to have a luminance distribution in which the luminance is the highest in the middle of the light guide plate 1 and light guide plate 7 even in the luminance distribution in the direction parallel to the row of light sources (the y axis direction).

According to the present invention, it is possible to achieve a luminance distribution in which luminance in the center is high using an effective reflecting prism in a light guide plate having an LED as a light source and in which light introduced from one direction or two opposing directions in an emission direction depending on the amount of luminance from the LED, and then emitted in an emission direction. In other words, the present invention takes advantage of the fact that visibility increases when the luminance is high in the center of the screen and the fact that the human eye cannot visually detect the luminance inconsistency. With this light guide plate, the total amount of light from the LED can be decreased due to the luminance dropping in the periphery that surrounds the center portion of the light guide plate, thereby saving energy.

Although only some exemplary embodiments of the light guide plate, die, and die processing method according to the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be used as a light guide plate which can, for example, achieve high-quality imaging with low light source output and without the need to increase luminance across the whole surface, and with which an efficient, low energy backlight can be realized.

The invention claimed is:

1. A light guide plate has a first surface and a second surface opposite the first surface, receives light in a first direction parallel with the second surface, and emits the light towards the first surface in a third direction perpendicular to the first surface, the light guide plate comprising:
    a light receiving portion which receives the light;
    a light guiding path which guides, in the first direction, the light received by the light receiving portion; and
    an emitting portion which emits the light guided in the first direction by the light guiding path, by reflecting the light guided in the first direction by the light guiding path towards the first surface in the third direction,
    wherein:
    the emitting portion is a first V-shaped groove having a V-shaped cross-section and extending on the second surface in a second direction crossing the first direction,
    a plurality of first V-shaped grooves including the first V-shaped groove is provided in a center region of the light guide plate in the first direction and each of the plurality of first V-shaped grooves is formed to be deepest in a center in the second direction and become shallower as a distance from the center along the second direction increases, and
    a plurality of second V-shaped grooves is provided at outer sides of the plurality of first V-shaped grooves in the first direction, and each of the plurality of second V-shaped grooves is formed to have a constant depth and extend on the second surface in the second direction.

2. The light guide plate according to claim 1,
    wherein an angle of a reflecting surface of the first V-shaped groove which reflects the light guided in the first direction by the light guiding path ranges from 45 degrees to 60 degrees relative to the first direction.

3. The light guide plate according to claim 1,
wherein the V-shaped cross-section is one of a plurality of V-shaped cross-sections, and the V-shaped cross-sections are isosceles triangles similar to each other across the first V-shaped groove in the second direction.

4. The light guide plate according to claim 1,
wherein the first V-shaped groove is provided toward a center of the plurality of first V-shaped grooves in the first direction and is formed to be deeper than the first V-shaped groove provided toward a periphery of the plurality of first V-shaped grooves in the first direction.

5. The light guide plate according to claim 1,
wherein a depth of the first V-shaped groove is represented by a continuous function such that, when the depth of the first V-shaped groove at the center is expressed as h, an end depth h2 is less than or equal to (h−h/6).

6. The light guide plate according to claim 1,
wherein a plurality of point light sources arranged in the second direction serve as a source of the light, and
wherein the light receiving portion which receives the light is a single planar surface of the light guide plate.

7. The light guide plate according to claim 1,
wherein the light is incident from two side surfaces of the light guide plate which are opposite each other.

8. The light guide plate according to claim 1,
wherein each of the plurality of second V-shaped grooves is identical in shape.

9. The light guide plate according to claim 1,
wherein each of the plurality of first V-shaped grooves has a depth distribution of a concentric circle.

10. The light guide plate according to claim 1,
wherein the plurality of second V-shaped grooves is provided in peripheral regions of the light guide plate that together cover 40% of the second surface, and
wherein the plurality of first V-shaped grooves is provided outside the peripheral regions of the light guide plate that together cover 40% of the second surface.

* * * * *